US009682719B2

(12) United States Patent
Stauff et al.

(10) Patent No.: US 9,682,719 B2
(45) Date of Patent: Jun. 20, 2017

(54) SHOPPING CARTS

(71) Applicant: Bemis Manufacturing Company, Sheboygan Falls, WI (US)

(72) Inventors: Rick Stauff, Plymouth, WI (US); Gary Vande Berg, Fox Lake, WI (US); Roy Watson, Lisbon, OH (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 0 days.

(21) Appl. No.: 14/951,012

(22) Filed: Nov. 24, 2015

(65) Prior Publication Data
US 2016/0075361 A1 Mar. 17, 2016

Related U.S. Application Data

(63) Continuation of application No. 13/609,070, filed on Sep. 10, 2012, now Pat. No. 9,227,646.
(Continued)

(51) Int. Cl.
*B62B 3/18* (2006.01)
*B62B 3/14* (2006.01)
(Continued)

(52) U.S. Cl.
CPC ............ *B62B 3/18* (2013.01); *B29C 45/14* (2013.01); *B29C 69/00* (2013.01); *B62B 3/02* (2013.01); *B62B 3/142* (2013.01); *B62B 3/1468* (2013.01); *B62B 3/1476* (2013.01); *B62B 3/1484* (2013.01); *B62B 3/1492* (2013.01); *B62B 3/1496* (2013.01); *B62B 5/067* (2013.01);
(Continued)

(58) Field of Classification Search
CPC ... B62B 3/1496; B62B 3/1436; B62B 3/1464; B62B 3/1468; B62B 3/1476; B62B 3/18; B62B 3/182; B62B 3/1484; B62B 5/067; B62B 3/14; B62B 2501/04
See application file for complete search history.

(56) References Cited

U.S. PATENT DOCUMENTS 2,479,530 A * 8/1949 Watson .................. B62B 3/14
206/519
2,556,532 A  6/1951 Goldman
(Continued)

FOREIGN PATENT DOCUMENTS

AU  4797885  4/1986
AU  581928  3/1989
(Continued)

OTHER PUBLICATIONS

International Invitation to Pay Additional Fees and Partial International Search for Application No. PCT/US2012/054514 dated Dec. 12, 2012 (8 pages).
(Continued)

*Primary Examiner* — Hau Phan
*Assistant Examiner* — Jacob Meyer
(74) *Attorney, Agent, or Firm* — Michael Best & Friedrich LLP

(57) ABSTRACT

A method of making a shopping cart includes forming a frame capable of supporting a plurality of basket assembly types, selecting from the plurality of basket assembly types a first basket assembly defining a first basket assembly type; and connecting the first basket assembly to the frame.

20 Claims, 21 Drawing Sheets

Related U.S. Application Data

(60) Provisional application No. 61/532,716, filed on Sep. 9, 2011, provisional application No. 61/660,984, filed on Jun. 18, 2012.

(51) Int. Cl.
| | |
|---|---|
| *B29C 69/00* | (2006.01) |
| *B62B 3/02* | (2006.01) |
| *B29C 45/14* | (2006.01) |
| *B62B 5/06* | (2006.01) |
| *B29C 45/17* | (2006.01) |
| *B29C 45/26* | (2006.01) |

(52) U.S. Cl.
CPC ...... *B29C 45/1706* (2013.01); *B29C 45/2675* (2013.01); *B62B 5/064* (2013.01); *B62B 2501/04* (2013.01); *B62B 2501/065* (2013.01); *Y10T 29/49622* (2015.01)

(56) References Cited

U.S. PATENT DOCUMENTS

| | | | | |
|---|---|---|---|---|
| 2,590,285 | A * | 3/1952 | Wiltshire | B62B 3/14 280/3 |
| 2,615,726 | A * | 10/1952 | Brottman | B62B 3/144 280/3 |
| 3,012,161 | A | 12/1961 | Puder | |
| 3,019,953 | A | 2/1962 | Martin | |
| 3,026,122 | A * | 3/1962 | Young | B62B 3/1468 280/33.995 |
| 3,039,564 | A * | 6/1962 | Shaukis | B62B 3/148 186/63 |
| 3,052,484 | A * | 9/1962 | Huffman | B62B 1/12 280/47.12 |
| 3,309,100 | A * | 3/1967 | Barbuti | B62B 3/14 280/33.996 |
| 3,353,836 | A * | 11/1967 | Davis | B62B 3/14 280/33.997 |
| 3,361,438 | A * | 1/1968 | Davis | B62B 3/14 280/33.991 |
| 3,534,973 | A * | 10/1970 | Elliott | B62B 3/1468 280/33.992 |
| 3,909,034 | A | 9/1975 | Trubiano | |
| 4,067,591 | A * | 1/1978 | Celms | B62B 3/14 280/33.997 |
| 4,097,056 | A * | 6/1978 | Castellano | B62B 3/14 280/33.991 |
| 4,127,786 | A | 11/1978 | Volkrodt | |
| 4,268,049 | A * | 5/1981 | Salvador | B62B 3/14 280/33.996 |
| 4,559,463 | A | 12/1985 | Kobayashi | |
| 4,616,839 | A | 10/1986 | Trubiano | |
| 4,647,055 | A | 3/1987 | Weill | |
| 4,733,877 | A | 3/1988 | Pastien | |
| 4,746,134 | A | 5/1988 | Rehrig | |
| 4,922,639 | A | 5/1990 | Rehrig | |
| 5,199,728 | A | 4/1993 | Hutchison | |
| 5,203,578 | A * | 4/1993 | Davidson | B62B 3/1464 206/509 |
| 5,331,756 | A | 7/1994 | Rehrig | |
| 5,435,582 | A * | 7/1995 | Davidson | B62B 3/1464 280/33.992 |
| 5,608,978 | A | 3/1997 | Sawyer | |
| 5,791,666 | A | 8/1998 | Mainard | |
| 5,947,313 | A | 9/1999 | Kern et al. | |
| 6,126,181 | A * | 10/2000 | Ondrasik | B62B 3/1476 280/33.991 |
| D435,196 | S | 12/2000 | Gregor et al. | |
| 6,490,979 | B1 | 12/2002 | Pfleger | |
| 6,540,240 | B2 * | 4/2003 | Nadeau | B62B 3/144 280/33.993 |
| 6,572,122 | B2 | 6/2003 | Johnson et al. | |
| 6,589,458 | B2 | 7/2003 | DeCost | |
| 6,644,674 | B2 * | 11/2003 | Simard | B62B 3/1468 280/33.991 |
| 6,705,623 | B2 | 3/2004 | Nadeau et al. | |
| 6,761,364 | B2 | 7/2004 | Murar et al. | |
| 6,923,456 | B2 | 8/2005 | Ryan et al. | |
| 6,932,363 | B2 * | 8/2005 | D'Angelo | A45B 11/00 211/126.6 |
| 6,983,944 | B2 * | 1/2006 | Bergia | B62B 3/1496 280/33.991 |
| 7,104,552 | B2 | 9/2006 | Swanson et al. | |
| D530,478 | S | 10/2006 | Splain et al. | |
| D538,501 | S * | 3/2007 | Walter | D34/21 |
| D540,998 | S | 4/2007 | Splain et al. | |
| 7,216,875 | B2 | 5/2007 | O'Quin | |
| D546,021 | S | 7/2007 | Splain et al. | |
| 7,237,782 | B2 | 7/2007 | Tucker et al. | |
| 7,240,910 | B2 | 7/2007 | Stuemke | |
| 7,255,271 | B2 | 8/2007 | Ulrich et al. | |
| D550,423 | S | 9/2007 | Splain et al. | |
| D556,413 | S | 11/2007 | Splain et al. | |
| 7,303,198 | B2 | 12/2007 | Higgins | |
| 7,322,582 | B2 | 1/2008 | Prather et al. | |
| 7,384,049 | B2 | 6/2008 | Peota et al. | |
| 7,398,976 | B2 | 7/2008 | Splain et al. | |
| D575,472 | S | 8/2008 | Splain et al. | |
| 7,407,169 | B2 | 8/2008 | Splain et al. | |
| 7,410,178 | B2 | 8/2008 | Splain et al. | |
| 7,416,194 | B2 | 8/2008 | Splain et al. | |
| D577,172 | S * | 9/2008 | Coderre | D34/12 |
| D580,619 | S * | 11/2008 | Walter | D34/21 |
| D582,122 | S | 12/2008 | Splain et al. | |
| D583,523 | S * | 12/2008 | Deal | D34/21 |
| 7,494,135 | B2 | 2/2009 | Ash et al. | |
| D588,774 | S | 3/2009 | Peota et al. | |
| D588,775 | S | 3/2009 | Peota et al. | |
| D591,474 | S | 4/2009 | Peota et al. | |
| D596,366 | S * | 7/2009 | Giampavolo | D34/17 |
| 7,600,763 | B2 | 10/2009 | Splain et al. | |
| D605,823 | S * | 12/2009 | Walter | D34/20 |
| D606,723 | S * | 12/2009 | Walter | D34/20 |
| D607,173 | S * | 12/2009 | Selvig | D34/21 |
| 7,681,891 | B2 * | 3/2010 | Deal | B62B 3/1472 280/33.991 |
| D615,723 | S * | 5/2010 | Walter | D34/12 |
| 7,766,347 | B2 | 8/2010 | Ryan et al. | |
| 7,780,036 | B2 | 8/2010 | Splain et al. | |
| 7,780,902 | B2 | 8/2010 | Pruitt, Jr. et al. | |
| D623,374 | S | 9/2010 | Splain et al. | |
| 7,793,948 | B2 | 9/2010 | Splain et al. | |
| 7,871,100 | B2 * | 1/2011 | Chen | B62B 7/10 280/47.41 |
| D633,269 | S * | 2/2011 | Walter | D34/21 |
| D638,602 | S * | 5/2011 | Walter | D34/21 |
| D639,521 | S * | 6/2011 | Walter | D34/21 |
| 7,959,166 | B2 | 6/2011 | Splain et al. | |
| D641,532 | S | 7/2011 | Peota et al. | |
| 7,976,033 | B2 * | 7/2011 | Alves | B62B 3/027 280/33.998 |
| D643,175 | S * | 8/2011 | Peota | D34/27 |
| D644,393 | S * | 8/2011 | Walter | D34/21 |
| D644,809 | S * | 9/2011 | Walter | D34/21 |
| D644,810 | S | 9/2011 | Peota et al. | |
| D645,222 | S * | 9/2011 | Walter | D34/21 |
| D645,631 | S * | 9/2011 | Walter | D34/21 |
| D648,915 | S * | 11/2011 | Walter | D34/21 |
| 8,056,909 | B2 * | 11/2011 | Burdwood | B62B 3/1404 280/33.991 |
| 8,066,291 | B2 * | 11/2011 | Cagan | B62B 3/1428 280/33.991 |
| 8,096,564 | B2 * | 1/2012 | Berthiaume | B29C 45/1704 280/33.992 |
| D656,288 | S * | 3/2012 | Walter | D34/27 |
| D656,700 | S * | 3/2012 | Walter | D34/27 |
| 8,141,895 | B2 * | 3/2012 | Haut | B62B 7/08 280/642 |
| D663,091 | S * | 7/2012 | Walter | D34/27 |
| D665,552 | S * | 8/2012 | Walter | D34/21 |
| D665,962 | S * | 8/2012 | Walter | D34/27 |

(56) References Cited

U.S. PATENT DOCUMENTS

| | | | |
|---|---|---|---|
| 8,256,777 B2 * | 9/2012 | Deal | B62B 3/1472 280/33.992 |
| 8,256,792 B2 | 9/2012 | Conrad et al. | |
| 8,282,119 B1 | 10/2012 | Caksa | |
| 8,313,114 B1 | 11/2012 | Aron | |
| D672,111 S * | 12/2012 | Walter | D34/21 |
| D677,033 S * | 2/2013 | Walter | D34/21 |
| D683,102 S | 5/2013 | Muscara | |
| D684,744 S * | 6/2013 | Walter | D34/27 |
| D685,972 S * | 7/2013 | Walter | D34/21 |
| 8,567,809 B2 * | 10/2013 | White | B62B 5/067 280/35 |
| D693,981 S * | 11/2013 | Walter | D34/27 |
| 8,684,371 B2 | 4/2014 | Berthiaume et al. | |
| 8,733,765 B2 * | 5/2014 | Padgett | B62B 3/1476 280/33.997 |
| D710,562 S * | 8/2014 | Stauff | D34/27 |
| D714,011 S | 9/2014 | Fredendall et al. | |
| D714,012 S | 9/2014 | Fredendall et al. | |
| 8,844,949 B2 * | 9/2014 | White | B62B 5/067 280/38 |
| 8,882,134 B2 * | 11/2014 | Rolicki | B62B 7/04 280/642 |
| D733,388 S | 6/2015 | Stauff et al. | |
| 9,085,314 B2 * | 7/2015 | Selvig | B62B 3/14 |
| 9,090,276 B1 * | 7/2015 | Ihrke | B62B 3/027 |
| D747,587 S | 1/2016 | Stauff et al. | |
| RE45,915 E * | 3/2016 | Walter | D34/21 |
| 9,283,975 B2 * | 3/2016 | McClanahan | |
| RE45,961 E * | 4/2016 | Walter | D34/27 |
| D756,586 S * | 5/2016 | Magnusson | D34/21 |
| RE46,268 E * | 1/2017 | Walter | D34/21 |
| RE46,281 E * | 1/2017 | Walter | D34/27 |
| 2001/0022436 A1 * | 9/2001 | Simard | B62B 3/1468 280/33.991 |
| 2002/0020976 A1 | 2/2002 | Nadeau et al. | |
| 2002/0020977 A1 | 2/2002 | Johnson et al. | |
| 2002/0074753 A1 * | 6/2002 | Thalhofer | B62B 3/02 280/33.998 |
| 2003/0057666 A1 | 3/2003 | Murar et al. | |
| 2003/0116933 A1 | 6/2003 | Nadeau | |
| 2003/0132612 A1 | 7/2003 | Pike et al. | |
| 2004/0104549 A1 | 6/2004 | Bergia | |
| 2004/0111320 A1 | 6/2004 | Schlieffers | |
| 2005/0087944 A1 | 4/2005 | Higgins | |
| 2005/0189731 A1 | 9/2005 | Swanson et al. | |
| 2005/0242549 A1 | 11/2005 | Longenecker et al. | |
| 2006/0157946 A1 | 7/2006 | Stuemke | |
| 2006/0181062 A1 | 8/2006 | Robinson | |
| 2006/0186620 A1 | 8/2006 | Tucker et al. | |
| 2007/0063463 A1 | 3/2007 | Splain et al. | |
| 2007/0063464 A1 | 3/2007 | Splain | |
| 2007/0126207 A1 | 6/2007 | Rojas et al. | |
| 2007/0210541 A1 | 9/2007 | Johnson | |
| 2008/0111328 A1 | 5/2008 | Ryan | |
| 2008/0164640 A1 | 7/2008 | Pruitt et al. | |
| 2008/0211200 A1 | 9/2008 | Eberlein | |
| 2008/0309037 A1 | 12/2008 | Hebert | |
| 2009/0033118 A1 | 2/2009 | Gomez | |
| 2009/0058024 A1 | 3/2009 | Cagan et al. | |
| 2009/0058025 A1 * | 3/2009 | Rolim De Oliveira | A45C 3/04 280/33.992 |
| 2009/0159402 A1 | 6/2009 | Webster | |
| 2009/0160146 A1 | 6/2009 | Berthiaume et al. | |
| 2009/0174161 A1 * | 7/2009 | Alves | B62B 3/027 280/47.35 |
| 2009/0242355 A1 | 10/2009 | Webster | |
| 2010/0038886 A1 | 2/2010 | Greger et al. | |
| 2010/0102523 A1 * | 4/2010 | Deal | B62B 3/1472 280/33.992 |
| 2010/0194064 A1 | 8/2010 | Simonson et al. | |
| 2010/0200629 A1 | 8/2010 | Reynolds | |
| 2010/0230934 A1 | 9/2010 | Fine | |
| 2010/0276899 A1 | 11/2010 | Burdwood et al. | |
| 2010/0276909 A1 | 11/2010 | Liu | |
| 2011/0062675 A1 | 3/2011 | Brown | |
| 2011/0147164 A1 | 6/2011 | Webster | |
| 2011/0148076 A1 | 6/2011 | Chen | |
| 2012/0074826 A1 | 3/2012 | Klaus et al. | |
| 2012/0097721 A1 | 4/2012 | Winterhalter et al. | |
| 2012/0161406 A1 | 6/2012 | Mersky | |
| 2012/0304440 A1 | 12/2012 | Berthiaume et al. | |
| 2013/0038036 A1 | 2/2013 | Lester | |
| 2013/0140778 A1 * | 6/2013 | Stauff | B62B 3/1476 280/33.996 |
| 2013/0153616 A1 | 6/2013 | Geva et al. | |
| 2013/0255736 A1 | 10/2013 | Horst | |
| 2013/0300076 A1 | 11/2013 | Berthiaume et al. | |
| 2013/0300090 A1 | 11/2013 | Wang | |
| 2014/0238992 A1 * | 8/2014 | Stauff | B62B 3/1404 220/485 |
| 2014/0346756 A1 * | 11/2014 | Laffan | B62B 9/26 280/648 |

FOREIGN PATENT DOCUMENTS

| | | |
|---|---|---|
| CA | 2314774 A1 | 1/2002 |
| CN | 201231775 | 5/2009 |
| CN | 201272379 | 7/2009 |
| CN | 102126510 | 7/2011 |
| CN | 201999032 | 10/2011 |
| DE | 3305378 | 9/1984 |
| DE | 3419488 | 11/1985 |
| DE | 102004048623 | 4/2006 |
| DE | 102007060983 | 6/2009 |
| DE | 102009042287 | 3/2011 |
| EP | 034655 | 4/1990 |
| EP | 0937625 | 8/1999 |
| EP | 1400428 A1 | 3/2004 |
| EP | 1591341 A2 | 11/2005 |
| FR | 2863997 | 6/2005 |
| GB | 962378 | 7/1964 |
| GB | 1007453 A | 10/1965 |
| GB | 2316368 | 2/1998 |
| JP | 3266770 A | 11/1991 |
| JP | 2012218502 A | 11/2012 |
| KR | 20010110253 | 12/2001 |
| KR | 20120037780 | 4/2012 |
| WO | WO 99/58438 | 11/1999 |
| WO | WO 01/81064 A1 | 11/2001 |
| WO | WO 2013/112644 A1 | 8/2013 |

OTHER PUBLICATIONS

EP14167584.3 Extended European Search Report dated Jun. 25, 2014 (8 pages).

EP14167583.5 Extended European Search Report dated Jun. 25, 2014 (8 pages).

International Search Report and Written Opinion for Application No. PCT/US2014/029474 dated Sep. 23, 2014 (24 pages).

EP12766247.6 European Examination Report dated May 20, 2016 (5 pages).

EP14167583.5 European Examination Report dated May 20, 2016 (5 pages).

* cited by examiner

SHOPPING CARTS

REFERENCE TO RELATED APPLICATIONS

This application is a continuation of co-pending, prior-filed U.S. patent application Ser. No. 13/609,070, filed Sep. 10, 2012, which claims the benefit of U.S. Provisional Patent Application No. 61/532,716, filed Sep. 9, 2011 and U.S. Provisional Patent Application No. 61/660,984, filed Jun. 18, 2012. The entire contents of each of these documents are incorporated herein by reference.

BACKGROUND OF THE INVENTION

The present invention relates to shopping carts, and particularly to the manufacture of shopping carts.

Conventional shopping cart frames are formed from glass-filled nylon, which is relatively expensive, but has previously been needed in order to meet standards for load and durability for shopping carts. Retail stores often have different needs for their respective shopping carts, requiring manufacturers to provide various cart sizes, shapes, and configurations in order to satisfy various retail stores. The wide variety of carts causes the manufacturer to develop separate tool molds for each of the cart types, resulting in significant costs for the manufacturer.

SUMMARY

In one embodiment, the invention provides a method of making a shopping cart. The method includes forming a frame capable of supporting a plurality of basket assembly types, selecting from the plurality of basket assembly types a first basket assembly defining a first basket assembly type; and connecting the first basket assembly to the frame.

In another embodiment, the invention provides a shopping cart including a frame supported for movement over the ground, a first handle, and a first basket assembly connected to the frame. The frame includes an upright portion and is capable of supporting a plurality of basket assembly types. The first handle is connected to the upright portion. The first basket assembly defines a first basket assembly type.

In yet another embodiment, the invention provides a shopping cart including a frame supported for movement over the ground, a first handle, and a first basket assembly. The frame includes an upright portion, and the first handle is connected to the upright portion. The first basket assembly includes a basket frame for supporting a plurality of basket wall types, and one of the plurality of basket wall types attached to the basket frame.

In still another embodiment, the invention provides a flat cart including a frame supported for movement over the ground and a deck that is pivotably connected to the frame. The frame includes a base defining a longitudinal axis and an upright portion including a handle. The deck is pivotable about a pivot axis transverse to the longitudinal axis between a lowered position and an upright position.

In still another embodiment, the invention provides a shopping cart having a front end and a rear end. The cart includes a first basket supported for movement over a floor or the ground and configured to be loaded from the rear, and a handle for pushing the cart.

In still another embodiment, the invention provides a shopping cart having a front end and a rear end and defining a cart axis therebetween. The cart includes a first basket supported for movement over a floor or the ground and a handle for pushing the cart, the handle being pivotable.

In yet another embodiment, the invention provides a shopping cart having a front end and a rear end and defining a cart axis therebetween. The cart includes a handle for pushing the cart, a first basket including a moveable first gate, and a second basket including a moveable second gate.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
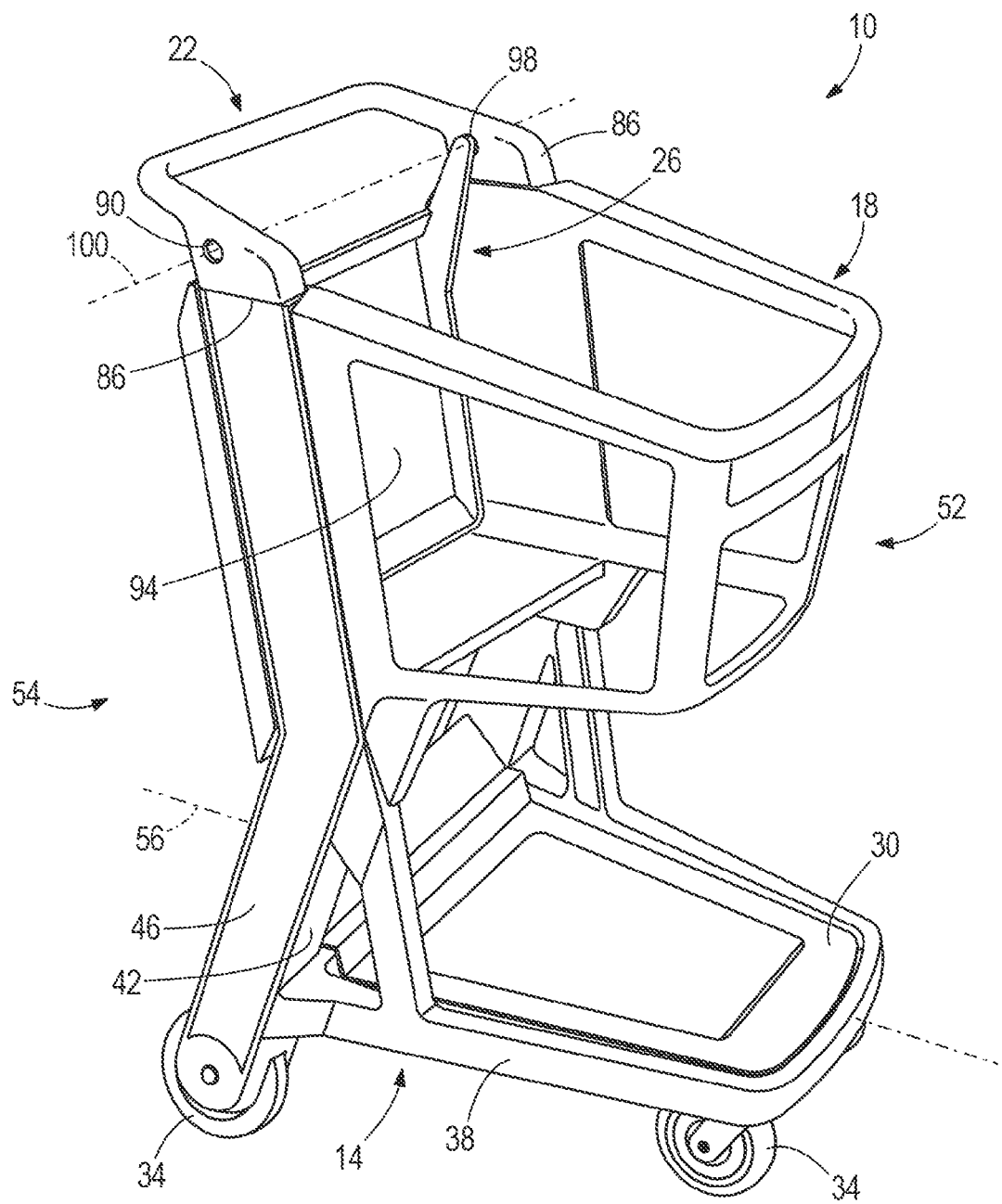
FIG. 1 is a perspective view of a shopping cart.
Figure 4:
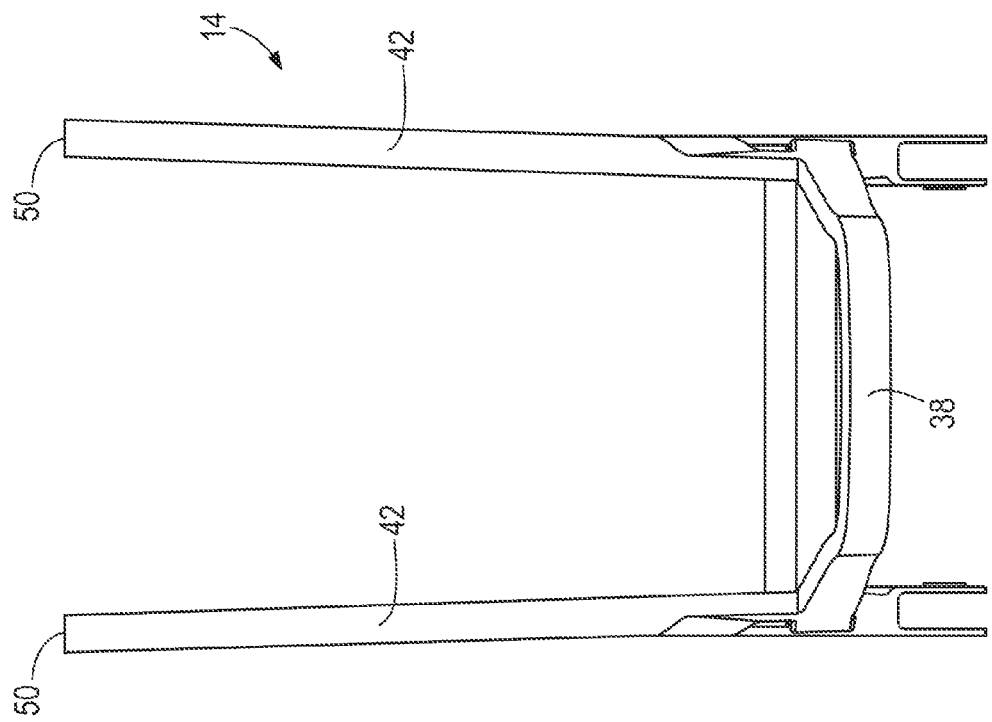
FIG. 4 is a front view of the frame of FIG. 3.
Figure 3:
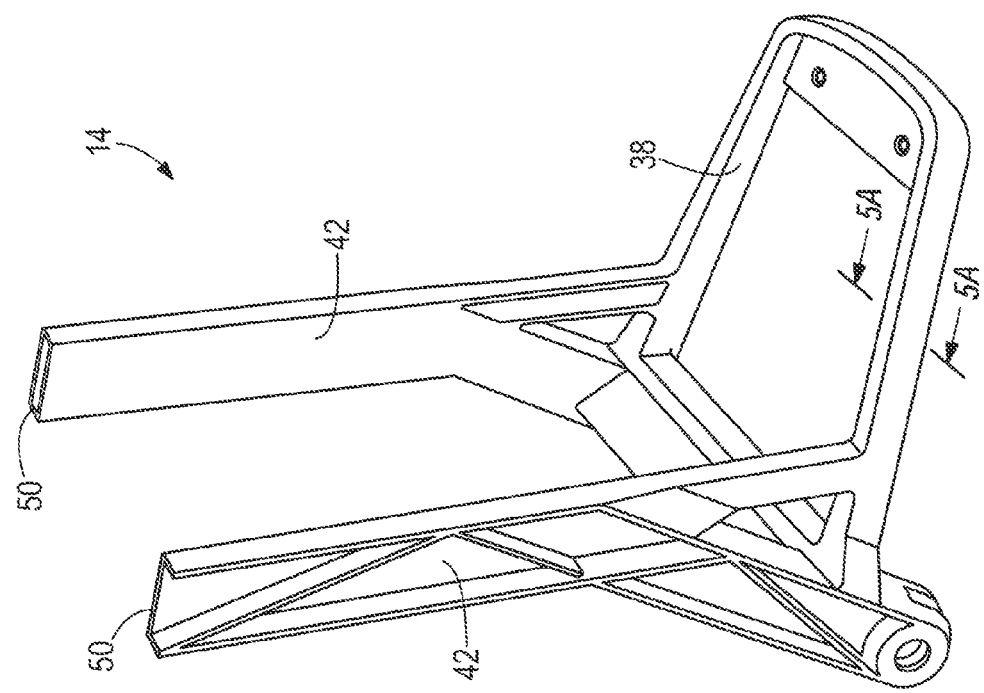
FIG. 3 is a perspective view of a frame.

FIG. 1 discloses a shopping cart 10. The shopping cart 10 includes a frame 14, a basket assembly 18, a handle 22, a rear gate 26, a lower tray 30, and multiple wheels 34 supporting the frame 14 for movement over the ground. In the embodiment shown in FIGS. 1-4, the frame 14 forms a U-shaped member including a base 38, uprights or arms 42 extending upwardly from the base 38, and a cover 46 connected to each arm 42. As best shown in FIG. 4, each arm 42 includes an upper end 50 positioned away from the base 38. The arms 42 taper inwardly from the upper ends 50, such that the distance between the arms 42 proximate the base 38 is less than the distance between the upper ends 50 of the arms 42. The cart 10 defines a front end 52, a rear end 54 opposite the front end 52, and a horizontal cart axis 56 extending between the front end 52 and the rear end 54. As used herein, the term "rearward" refers to a direction that extends toward the rear end 54, and the term "forward" refers to a direction that extends toward a front end 52.

Figure 5A:
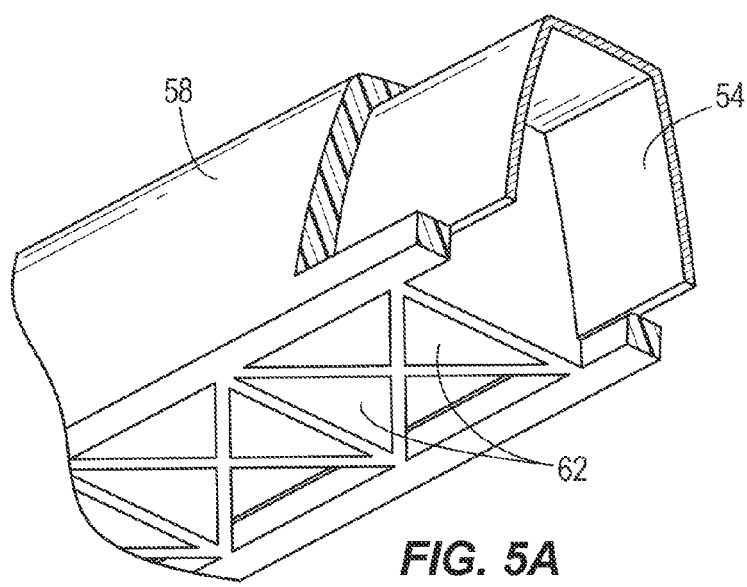
FIG. 5A is a perspective view of a cross-section of the frame of FIG. 4 taken along line 5A-5A.
Figure 5B:
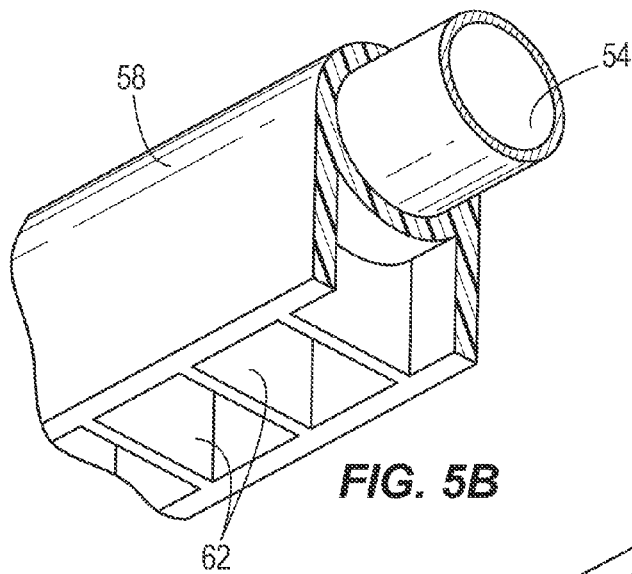
FIG. 5B is a perspective view of a cross-section of the frame of FIG. 4 according to another embodiment.
Figure 5C:
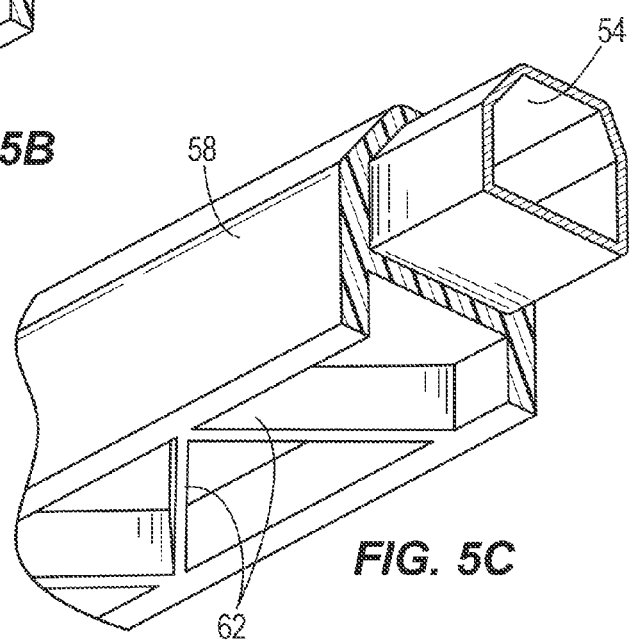
FIG. 5C is a perspective view of a cross-section of the frame of FIG. 4 according to another embodiment.

The frame 14 is formed by a combination of over-molding and gas-assist plastic forming processes. As shown in FIG. 5A, a substrate 58 such as a piece of metal is over-molded by plastic material 60. Although the substrate 58 in FIG. 5A has a cross-section that is U-shaped, the substrate 58 can be formed into various other shapes, including a round tube (FIG. 5B) or an enclosed piece that is partially hexagonal and partially rectangular (FIG. 5C). In the illustrated embodiments, the plastic material 60 near the substrate 58 is molded as a lattice structure having ribs 62 for increased rigidity. In one embodiment, the substrate 58 is made from steel, although in other embodiments the substrate could be made from another material. The plastic material 60 may include any type of injection-molded plastic. The gas-assist process creates at least one hollow cavity (not shown) in the plastic material 60. This combination process yields a frame 14 that is both strong and low weight. The substrate 58 and the geometric relationship between the substrate 58 and the plastic 60 increases rigidity over a simple injection-molded plastic. The combination process satisfies the load and durability standards, is less expensive than conventional glass-filled nylon processes, and provides a frame 14 having a lower density than the glass-filled nylon frames. In one embodiment, a frame 14 made using the combination process costs about $0.60 per pound and has a lower density, whereas a frame made from glass-filled nylon costs about $2 per pound and has a higher density.

Figure 2:
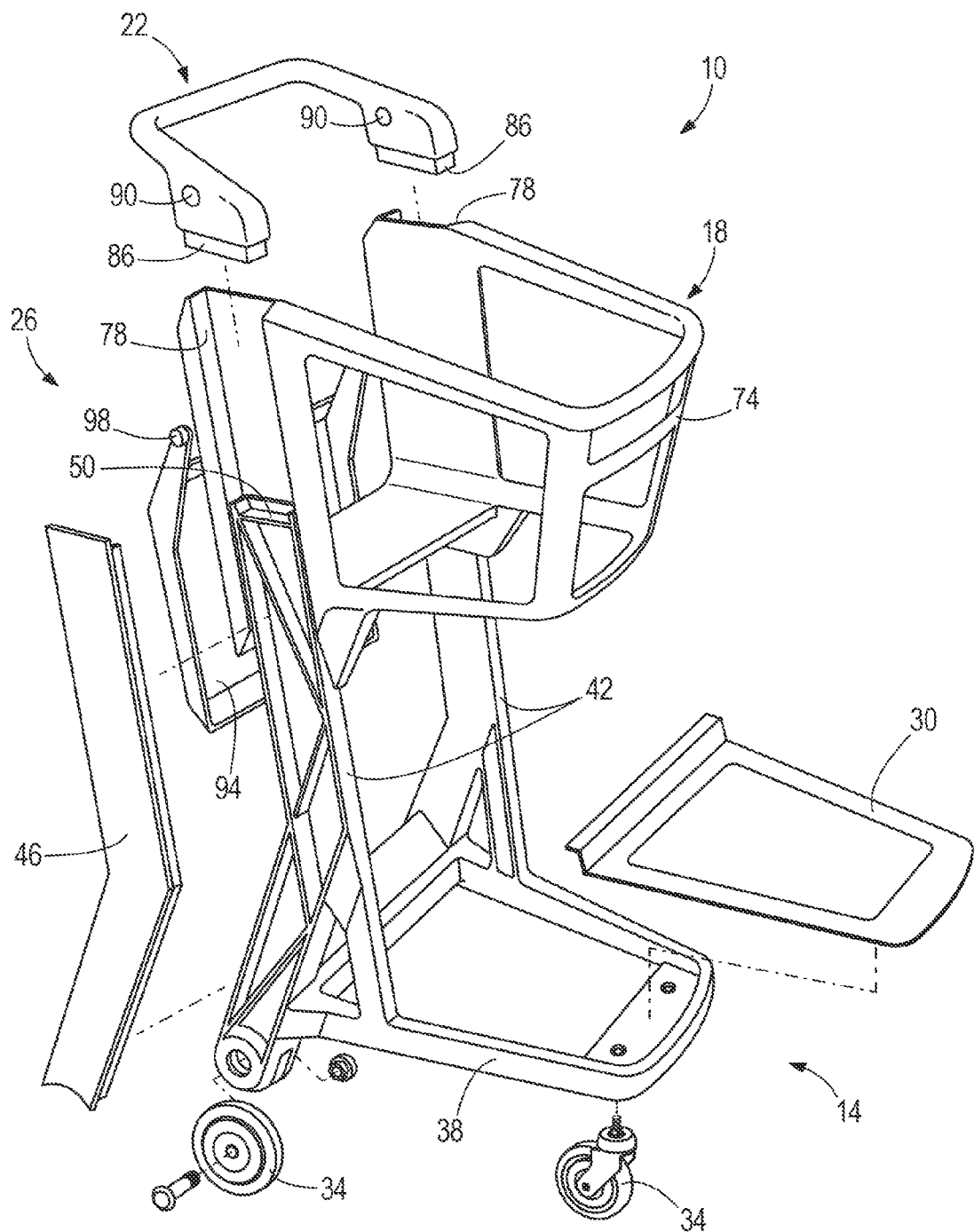
FIG. 2 is an exploded view of the shopping cart of FIG. 1.
Figure 12:
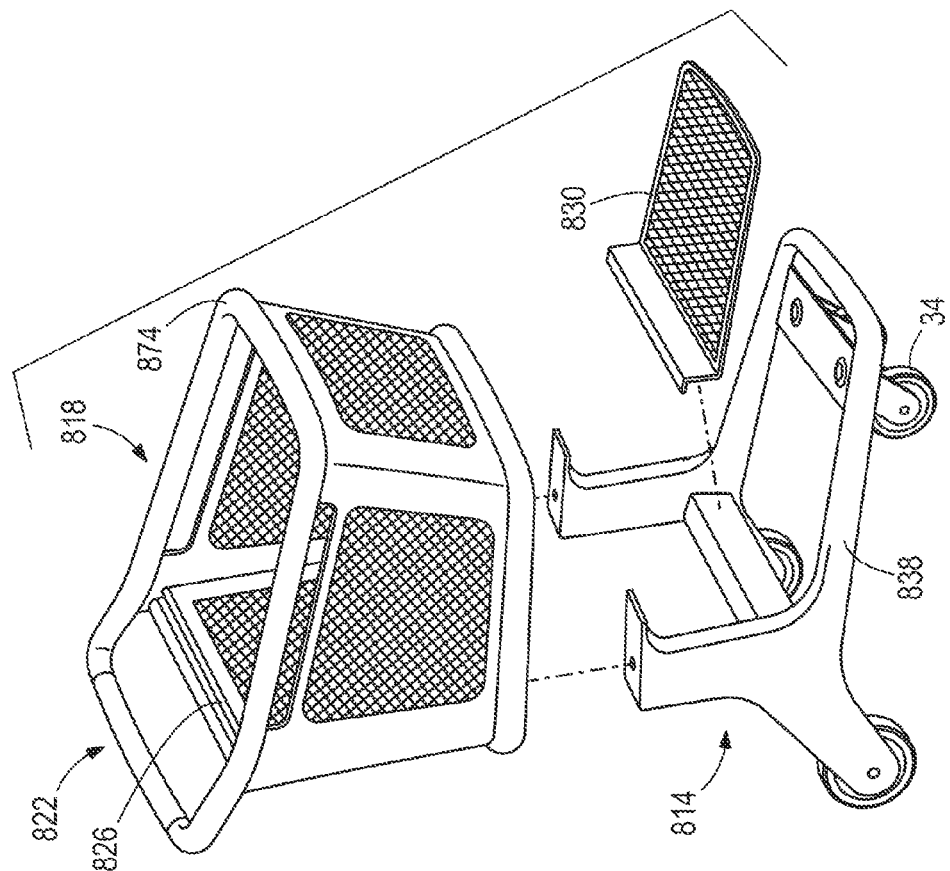
FIG. 12 is a perspective view of a shopping cart according to another embodiment.

Referring to FIG. 2, the basket assembly 18 is removably coupled to the frame 14 and includes a basket frame 74 and a pair of slots 78 on either side of the basket frame 74. The slots 78 receive the upper ends 50 of the arms 42. The walls and bottom surface of the basket assembly 18 have been removed for purposes of clarity; the basket assembly 18 also includes basket walls similar to those shown in FIGS. 12-13 and FIG. 22. The basket assembly 18 is moved onto the arms 42 and slides down along the arms 42 until the basket assembly 18 reaches a predetermined position. In the illustrated embodiment, the predetermined position is the point at which the slots 78 engage the arms 42 in an interference fit due to the inward taper of the arms 42. In other embodiments, the predetermined position may be defined by a detent that locks the basket assembly 18 in place relative to the arms 42, or the basket assembly 18 may be secured relative to the arms 42 by fasteners.

Referring to FIGS. 1 and 2, the handle 22 includes a generally U-shaped member having two ends 86 that are adapted to engage the upper ends 50 of the arms 42. After the basket assembly 18 is secured relative to the frame 14, the handle 22 is coupled to the upper ends 50 of the arms 42, further locking the basket assembly 18 in position. The handle 22 also includes a pair of openings 90 (FIG. 2), each of which is positioned proximate one of the handle ends 86. In the illustrated embodiment, the handle ends 86 are secured to the arms 42 by a snap fit or interference fit.

Figure 7A:
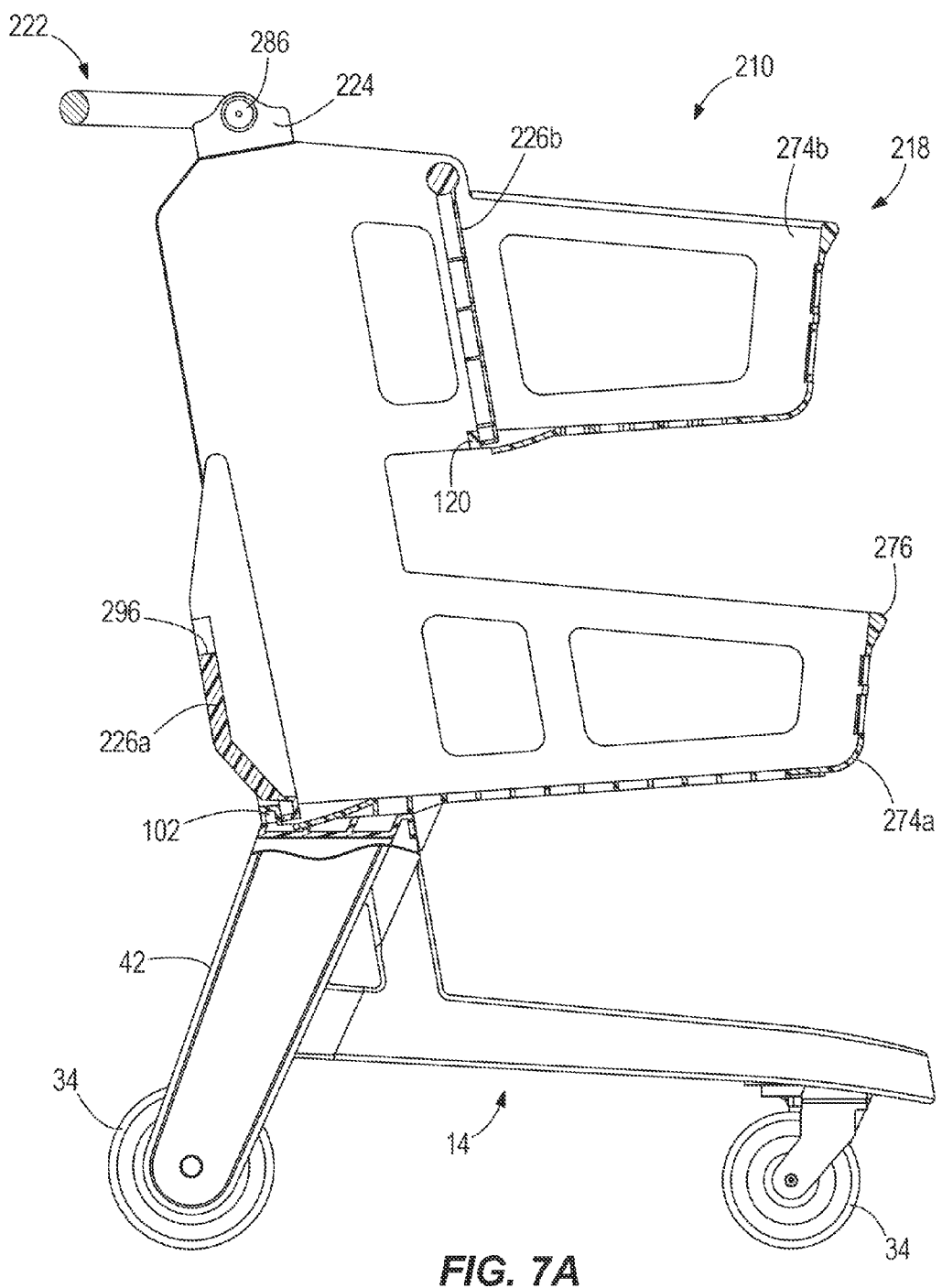
FIG. 7A is a cross-section view of the shopping cart of FIG. 6 taken along line 7A-7A.

The rear gate 26 includes a wall 94 and a pair of gate arms 98 and is positioned proximate the rearward end of the cart 10. The gate arms 98 are positioned on opposite edges of the wall 94 and extends away from the wall 94. In the embodiment shown in FIGS. 1 and 2, each gate arm 98 is positioned within one of the openings 90 on the handle 22. The rear gate 26 is thus pivotably coupled to the handle 22 and pivots about a gate axis 100 transverse to the cart axis 56. When a second cart (not shown) is pushed into the rear of the shopping cart 10, the rear gate 26 pivots upwardly, toward the front of the basket assembly 18 in order to enable the basket assembly of the second cart to nest within the basket assembly 18. In other embodiments, the gate arms 98 may engage openings positioned on the basket assembly 18. The rear gate 26 engages a stop 102 (FIG. 7A) positioned on the basket assembly 18 to prevent the rear gate 26 from pivoting beyond the rearward end of the basket frame 74, i.e., to limit pivoting of the rear gate 26 in a clockwise direction as shown in FIG. 7A.

The frame 14 is capable of supporting multiple types of basket assemblies 18. For example, in an alternative embodiment shown in FIGS. 6-8, a second basket assembly 218 includes multiple basket frames 274 having different sizes and characteristics from the first basket assembly 18. The basket assembly of FIGS. 6-8 includes a first or lower basket 274a and a second or upper basket 274b. In addition, the handle 222 is pivotably coupled to blocks 224 that are coupled to the arms 242. In the illustrated embodiment, the handle 222 is formed as a U-shaped member that is pivotably coupled to the cart 10 at each end 286. The handle 222 is pivotable about a handle axis 228 (FIG. 7B) transverse to the cart axis 256. In other embodiments, the handle 222 may be coupled to the basket assembly 218 or the handle axis 228 may be oriented in a different direction.

Figure 7B:
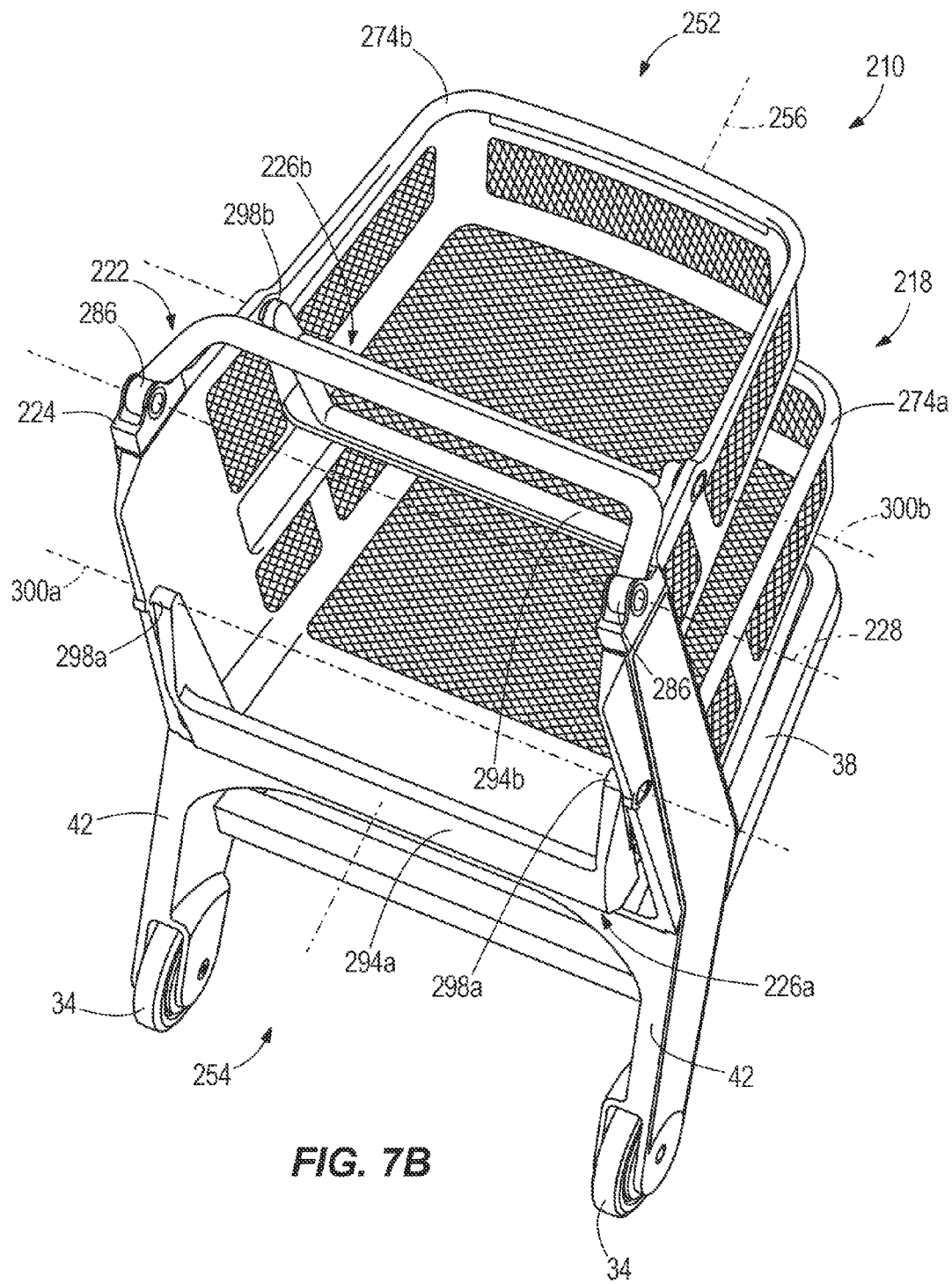
FIG. 7B is a rear perspective view of the shopping cart of FIG. 6.
Figure 8:
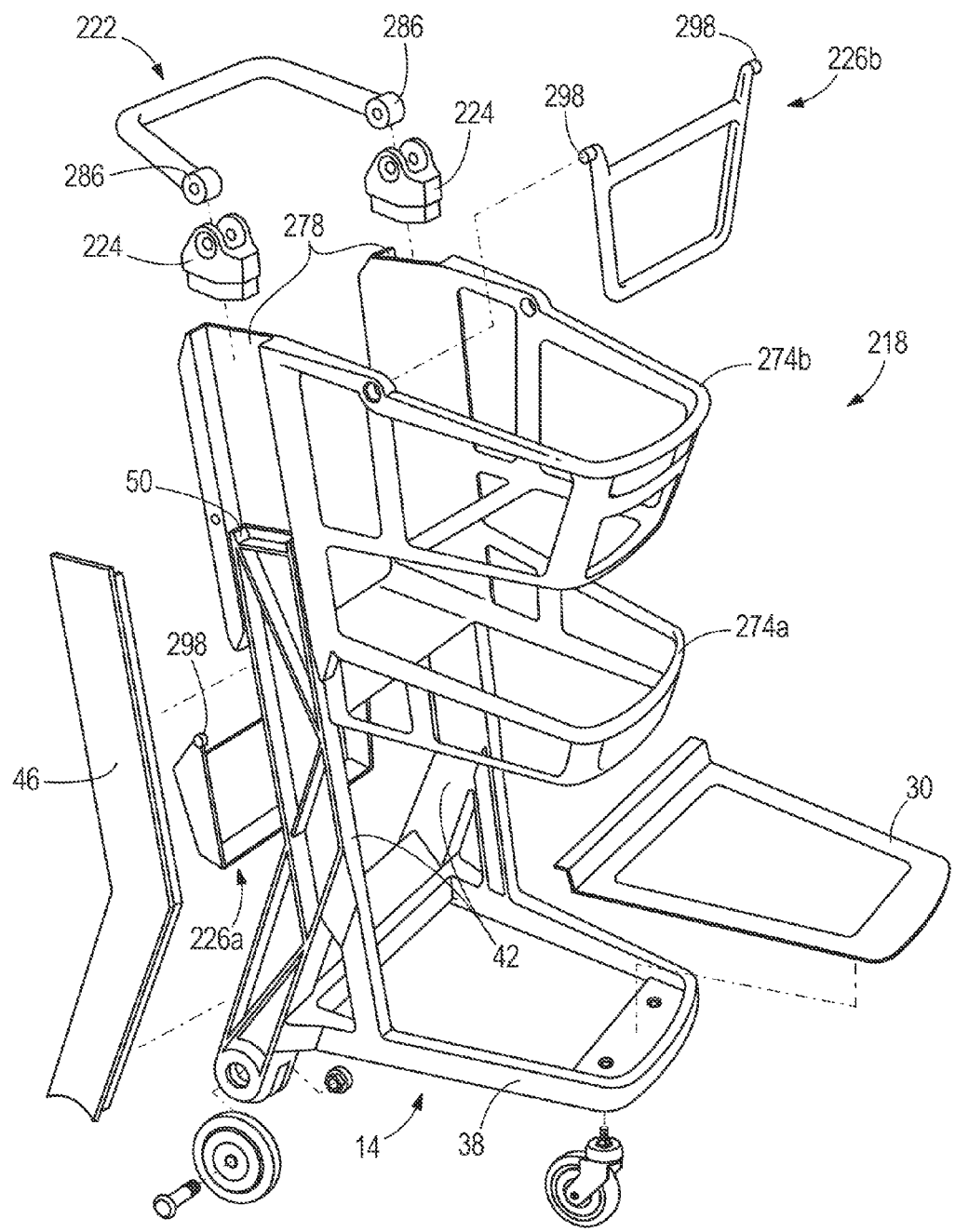
FIG. 8 is an exploded view of the shopping cart of FIG. 6.

Referring to FIG. 7B, the upper basket 274b is substantially above the lower basket 274a. The lower basket 274a includes a first or lower gate 226a proximate the rear end 254 of the cart 210. The lower gate 226a is pivotable about a lower gate axis 300a transverse to the cart axis 256 between a raised position and a lowered position. The lower gate 226a is similar to the rear gate 26 described above with respect to FIGS. 1 and 2. The lower gate 226a includes a wall 294a and a pair of arms 298a for coupling the lower gate 226a to the lower basket 274a. The wall 294a extends across the rearward end of the lower basket 274a when the lower gate 226a is in the lowered position. As shown in FIG. 7A, the wall 294a has an upper end 296 below an upper end 276 of the lower basket 274a when the lower gate 226a is in the lowered position.

As shown in FIG. 7B, the upper basket 274b includes a second or upper gate 226b proximate the rear end 254 of the cart 210. The upper gate 226b is pivotable about an upper gate axis 300b transverse to the cart axis 256 between a raised position and a lowered position. The upper gate 226b includes a wall 294b (FIG. 7B) and a pair of arms 298b for coupling the upper gate 226b to the upper basket 274b. The wall 294b extends across a rearward end of the upper basket 274b when the upper gate 226b is in a lowered position. Both the lower gate 226a and the upper gate 226b pivot upwardly toward the front of each basket 274a, 274b to allow the lower basket 274a and the upper basket 274b to receive a lower basket and upper basket, respectively, of another cart (not shown). The stops 102 (FIG. 7A) prevent the gates 226a, 226b from pivoting backward beyond the rearward end of each basket 274a, 274b.

The lower basket 274a is configured to be loaded from the rear. As best illustrated in FIGS. 7A and 7B, the lower basket 274a is positioned partially behind the upper basket 274b, enabling a user to load and unload the lower basket 274a from behind the cart 210 and beneath the handle 222. Stated another way, a rearward end of the upper basket 274b is positioned forward of a rearward end of the lower basket 274a to provide easy access to the contents of the lower basket 274a from the rear of the cart 210. In addition, because the upper end 296 of the wall 294a is below the upper end 276 of the lower basket 274a when the lower gate 226a is in the lowered position, it is easier for a user to load and unload the lower basket 274a.

Figure 6:
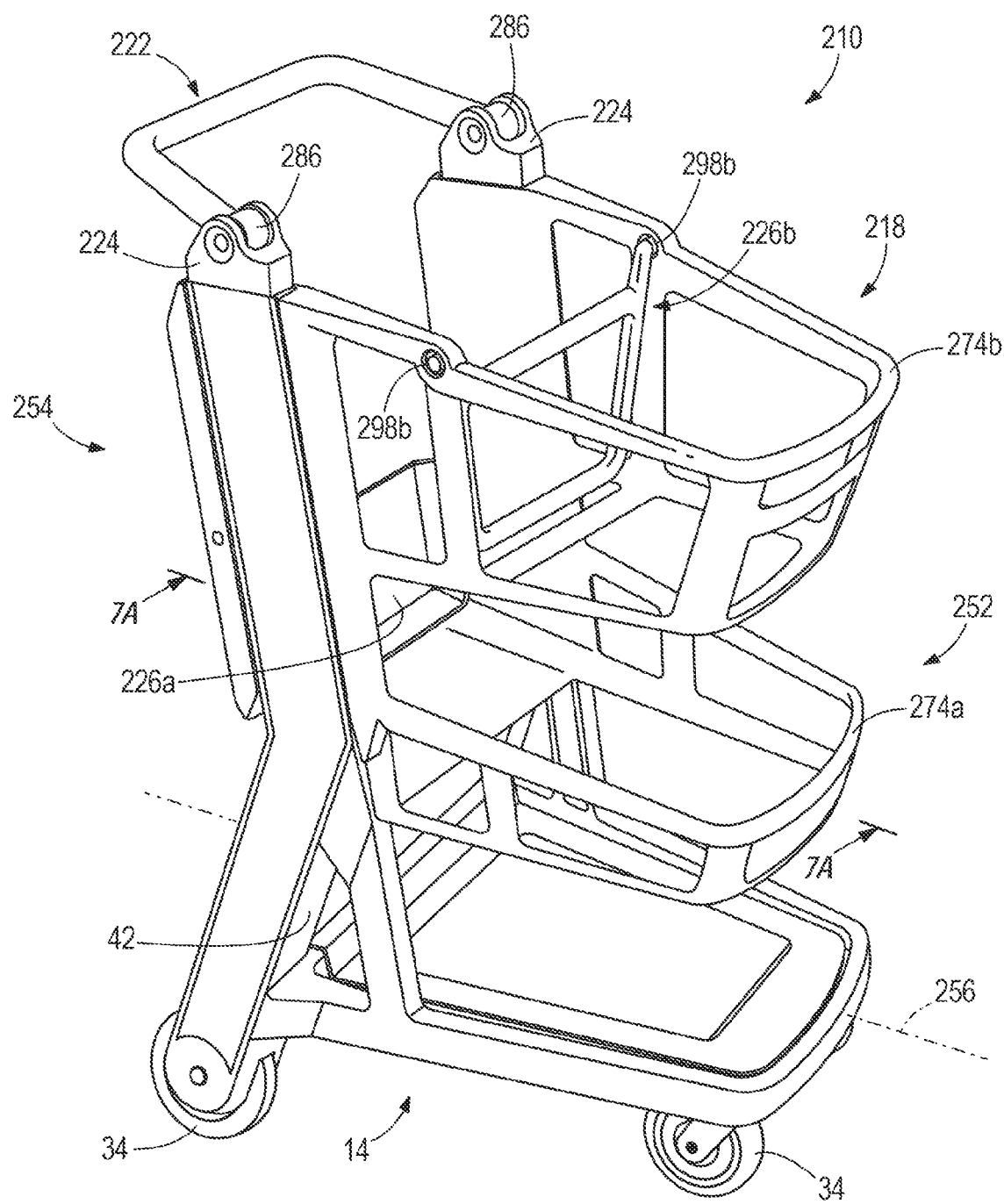
FIG. 6 is a perspective view of a shopping cart according to another embodiment.

The handle 222 is moveable about the handle axis 228 between at least a first or rear position (FIG. 6) and a second or forward position (FIG. 7A). As shown in FIG. 6, in the rear position the handle 222 extends toward the rear end 254 of the cart 210. This configuration allows the user to push the cart 210 with the handle 222. Referring to FIG. 7B, in the forward position the handle 222 extends toward the front end 252 of the cart 210. In the forward position, the handle 222 is substantially aligned with the upper gate 226b (see FIG. 7B) and forward of the rearward end of the lower basket 274a. This position of the handle 222 improves access to the lower basket 274a, allowing the user to more easily load or unload the lower basket 274a from the rear. The frame 14 is configured to support many types of basket assemblies 18, so the manufacturer can select a basket assembly 18 from multiple types of basket assemblies 18 in order to customize the cart 10 as necessary. This reduces the need to manufacture many types of carts 10 individually, instead providing a modular approach for manufacturing the carts 10 from similar parts.

Figure 9:
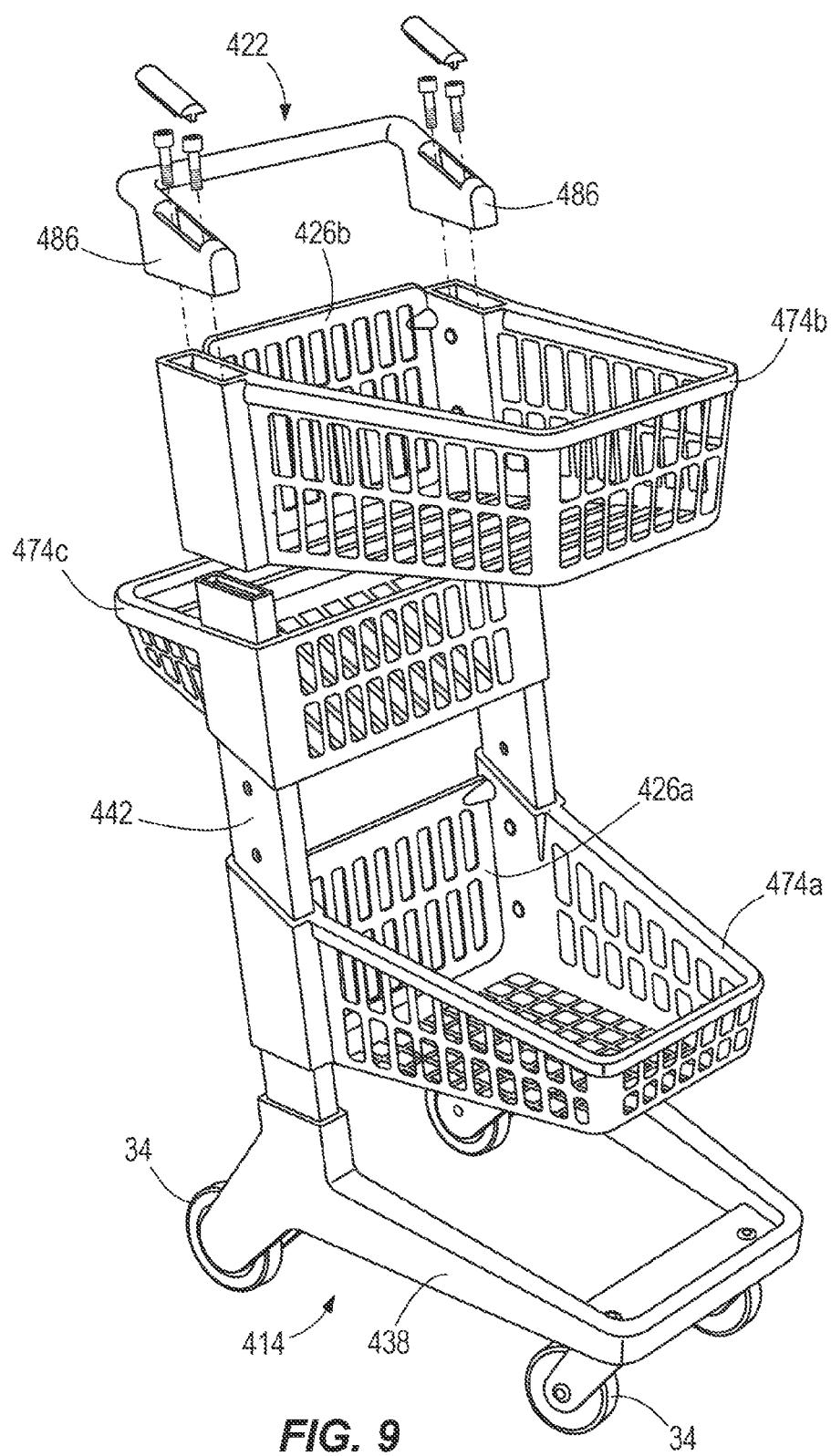
FIG. 9 is an exploded view of a shopping cart according to another embodiment.
Figure 10:
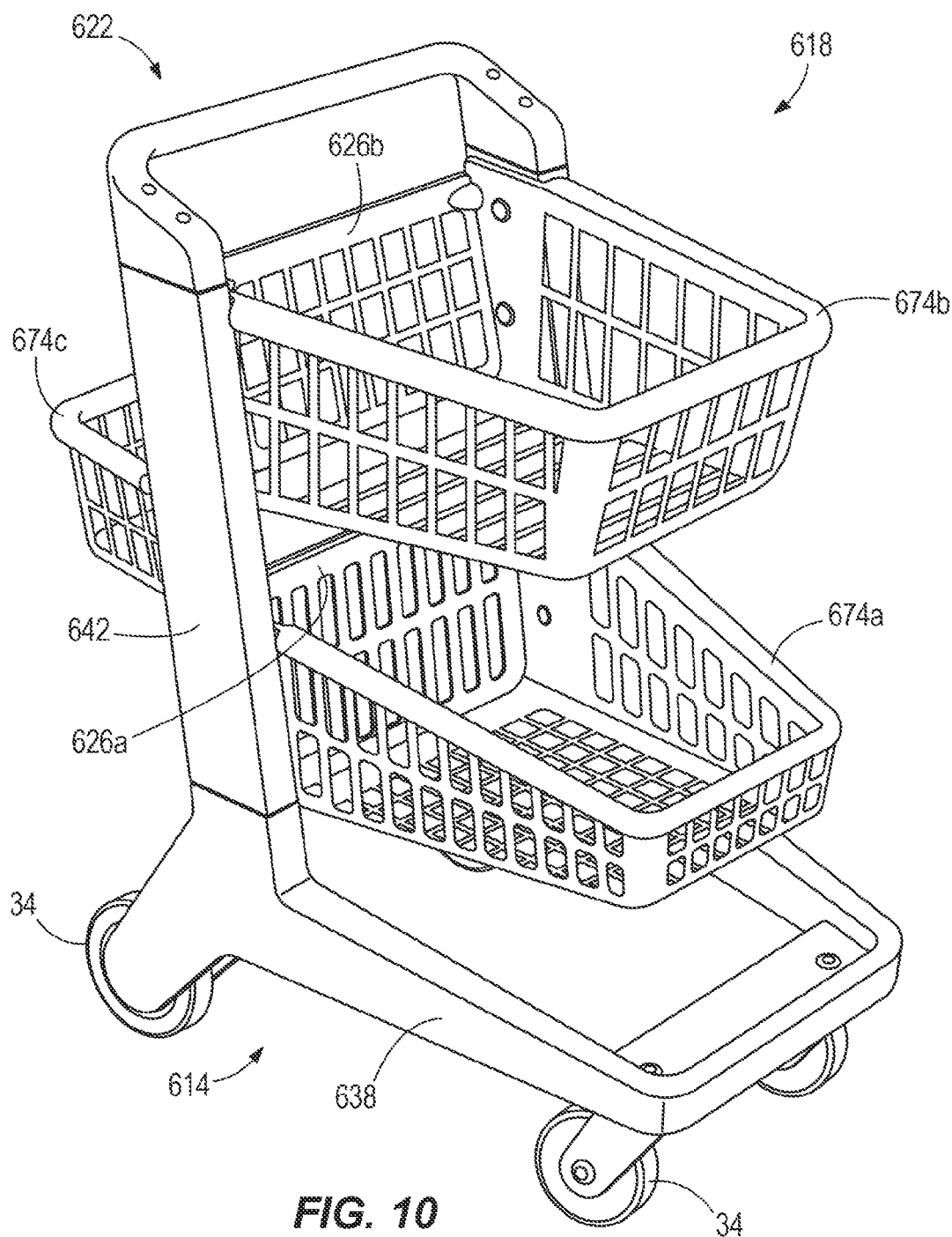
FIG. 10 is a perspective view of a shopping cart according to another embodiment.
Figure 11:
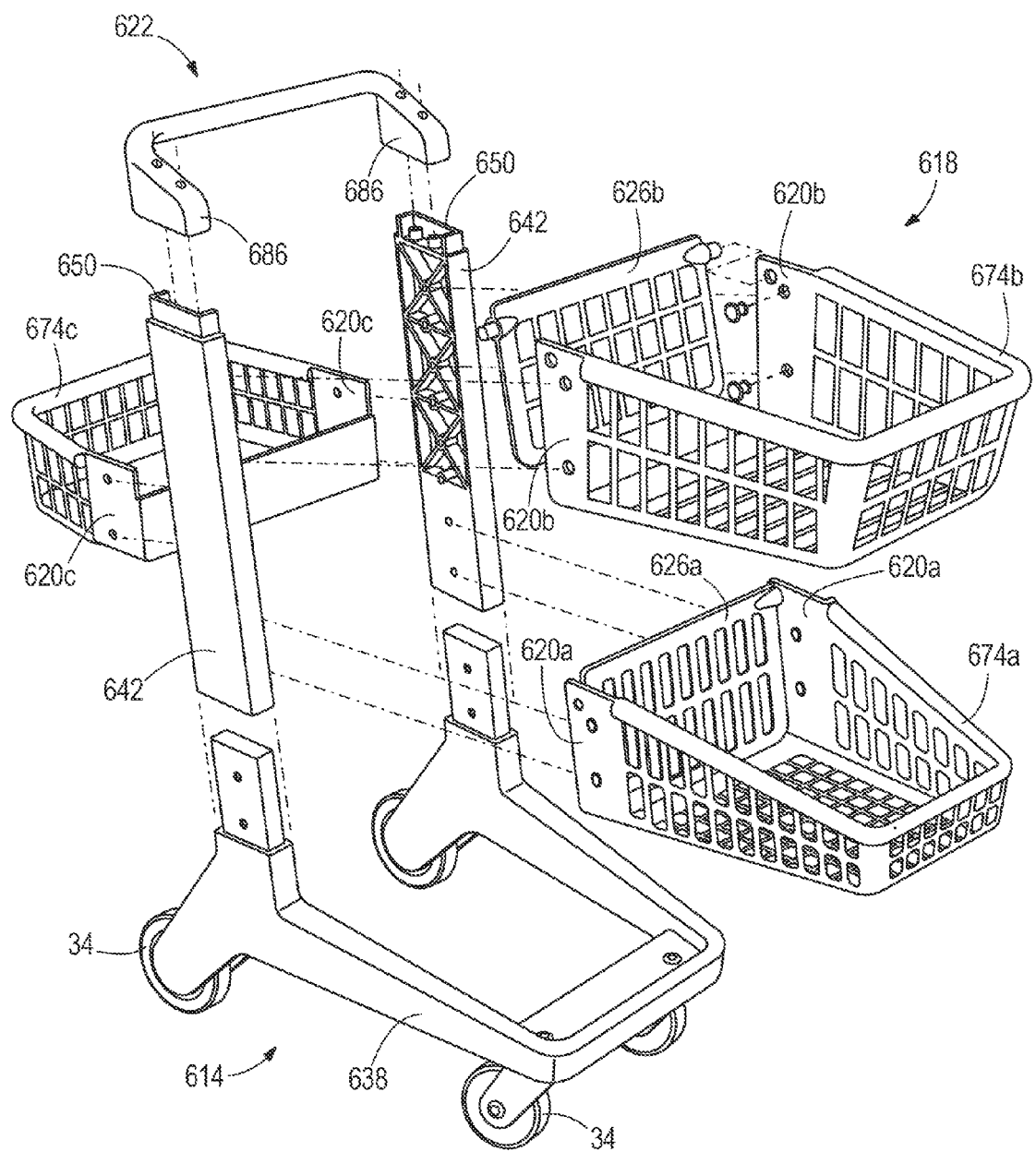
FIG. 11 is an exploded view of the shopping cart of FIG. 10.
Figure 13:
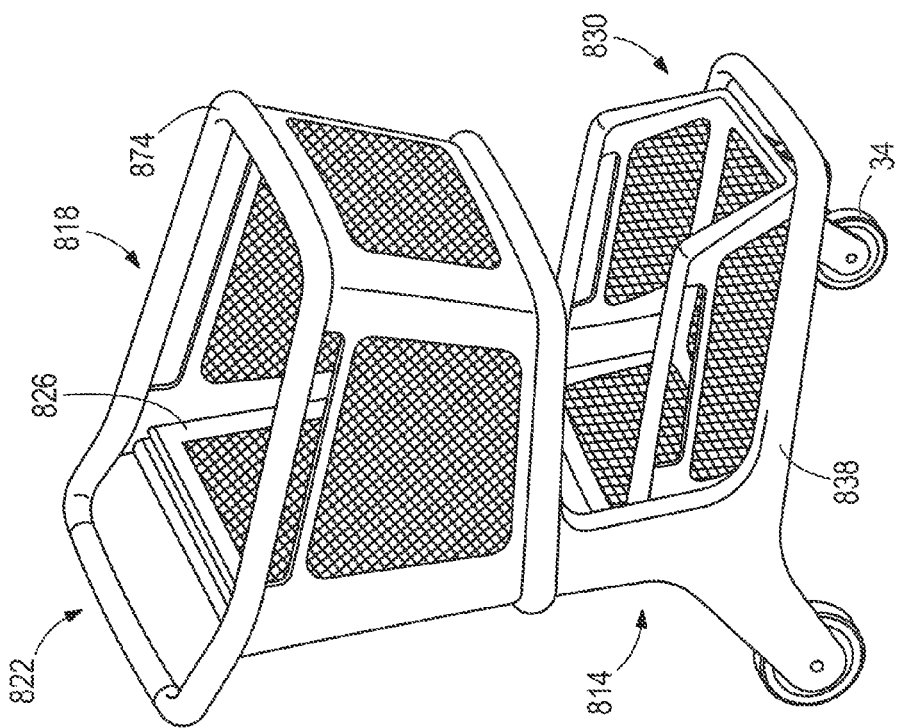
FIG. 13 is a perspective view of a shopping cart according to another embodiment.
Figure 14:
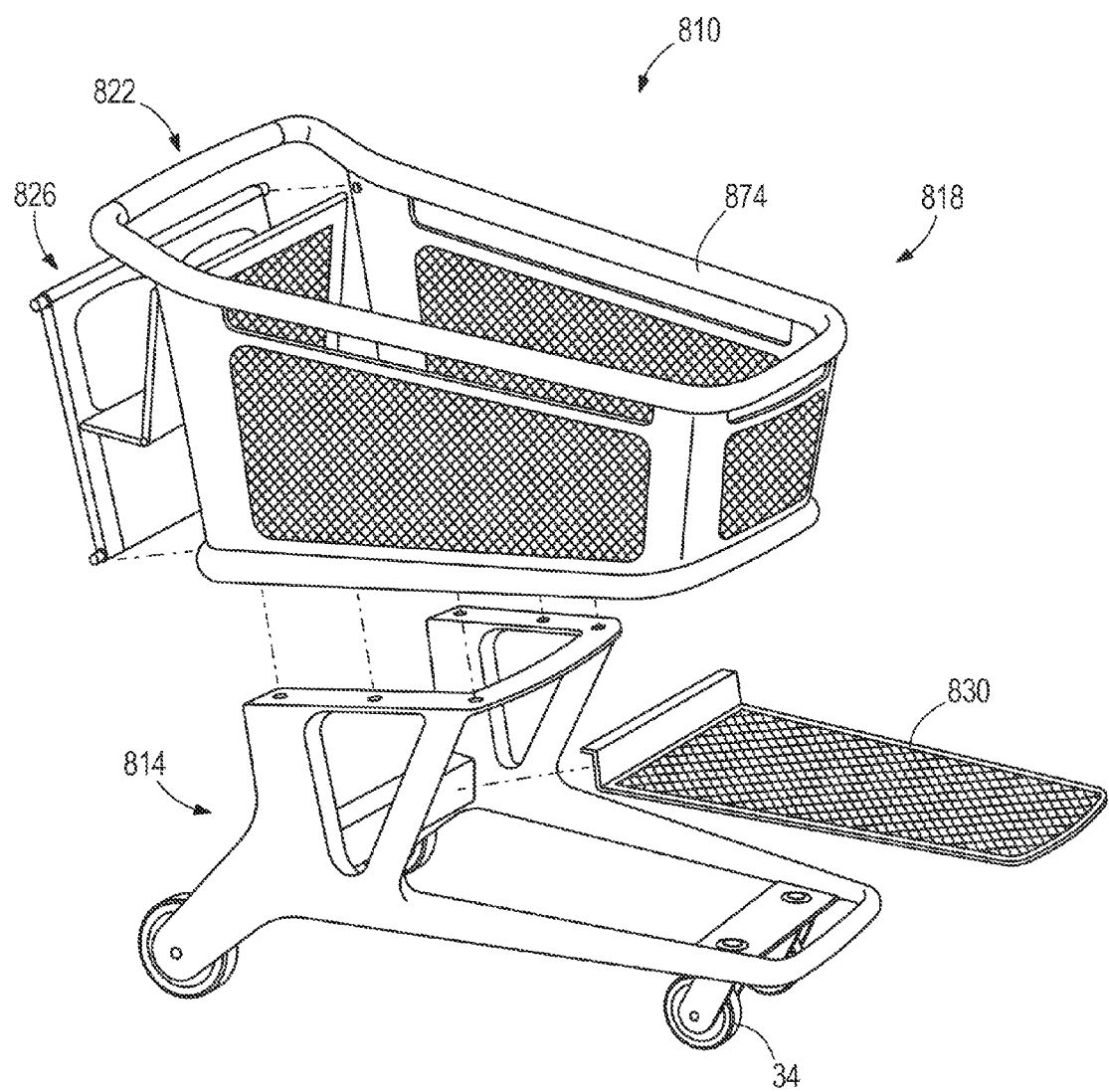
FIG. 14 is a perspective view of a shopping cart according to another embodiment.

In other embodiments, shown in FIG. 9, multiple basket assemblies 418 may be positioned on the arms 442, including one or more rear-facing baskets 474c. In this embodiment, the handle 422 includes ends 486 that are coupled to the arms 442 by fasteners such as bolts. Alternatively, as shown in FIGS. 10-11, the arms 642 can be removably received on the frame 614, and the basket assemblies 618 include brackets 620 for coupling each basket assembly 618 to the arms 642. The bracket 620 can be secured to the arms 642 by a snap fit or by fasteners. The alternative embodiments of FIGS. 12-14 also illustrate that the basket assembly 818 can be directly fastened to the frame 814, and the handle 822 may be formed integrally with the basket assembly 818 or the frame 814. In addition, FIG. 13 shows a cart 810 in which the lower tray 830 includes an open-ended basket.

Figure 15:
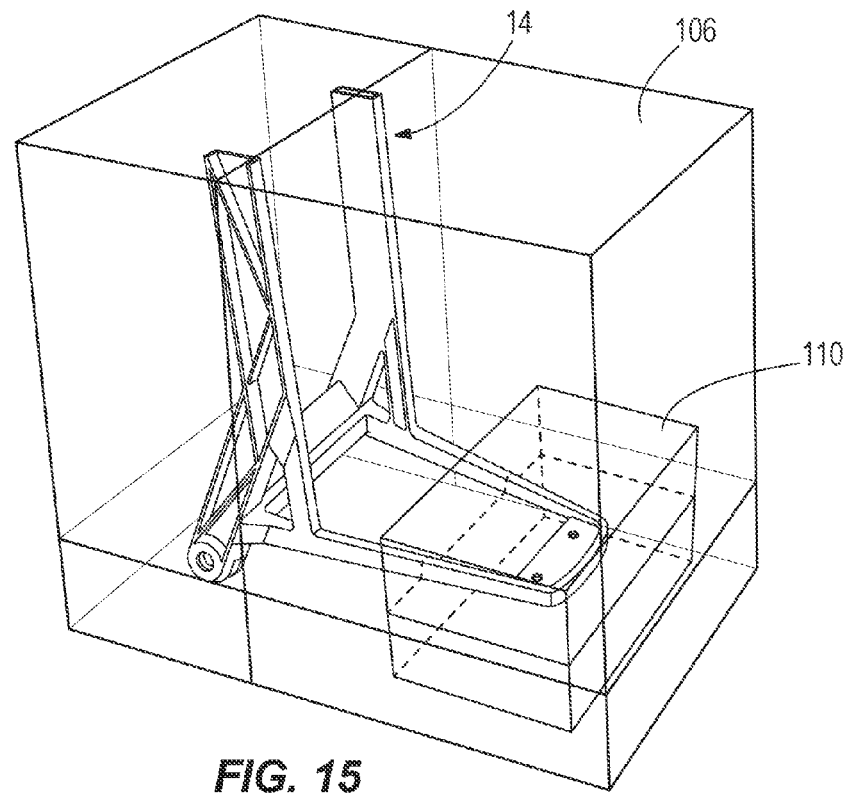
FIG. 15 is a perspective view of a mold.
Figures 16, 17:
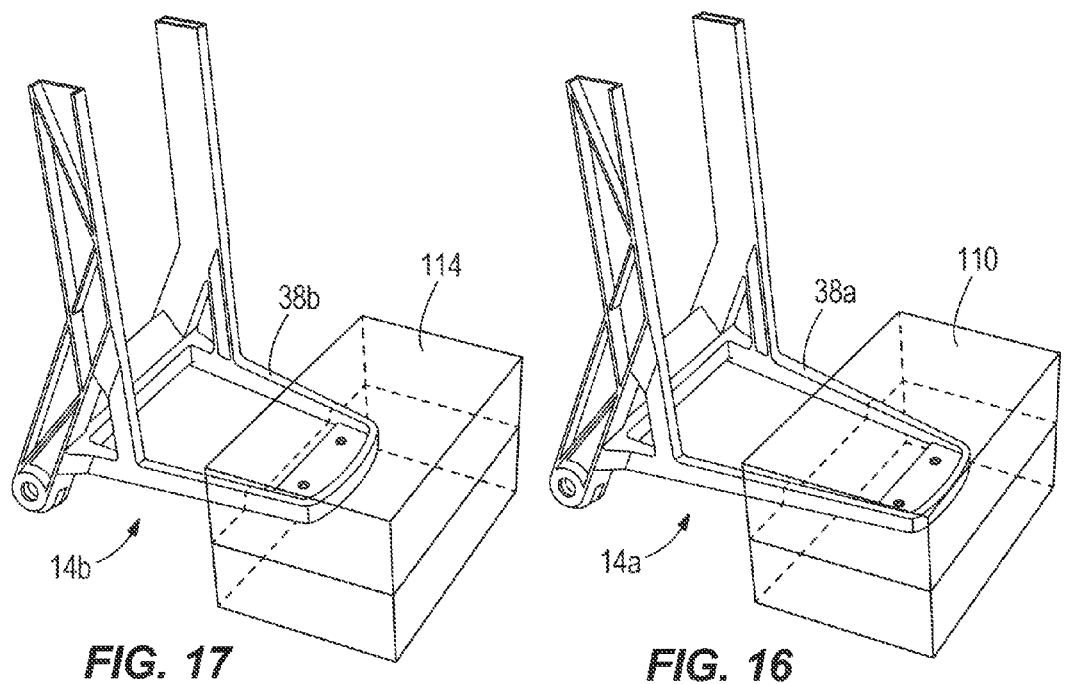
FIG. 16 is a perspective view of a frame portion and a first mold insert.
FIG. 17 is a perspective view of a frame portion and second mold insert.
Figure 19:
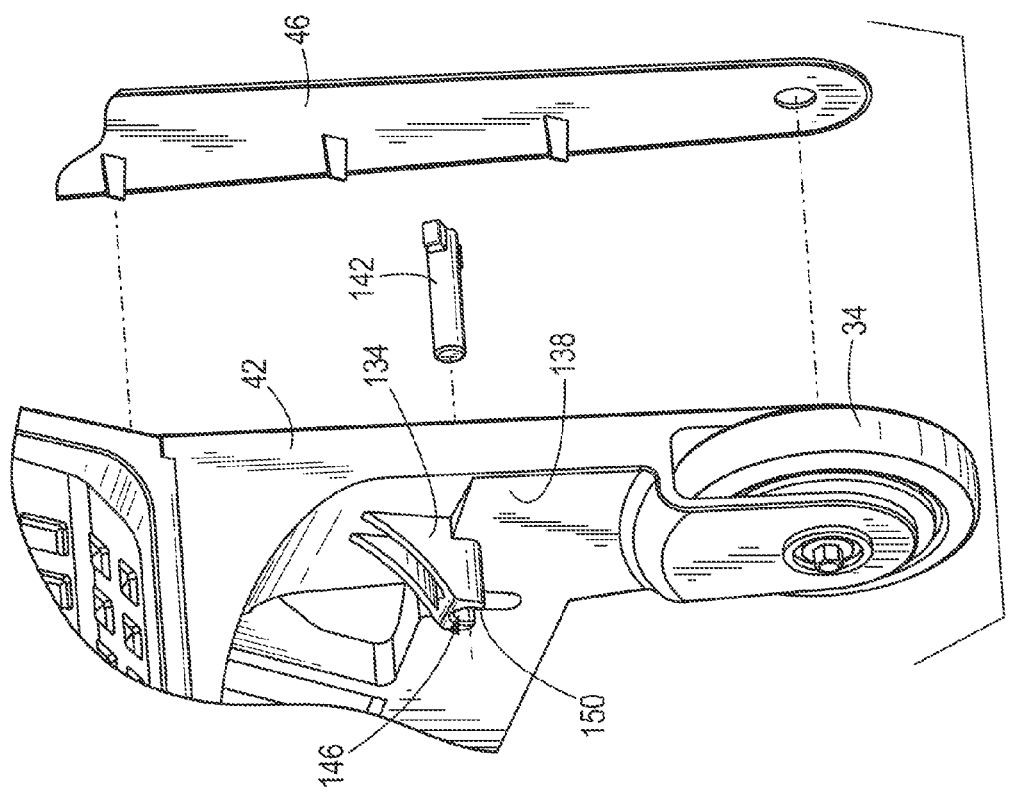
FIG. 19 is an exploded view of the caster lifting mechanism of FIG. 18.
Figure 18:
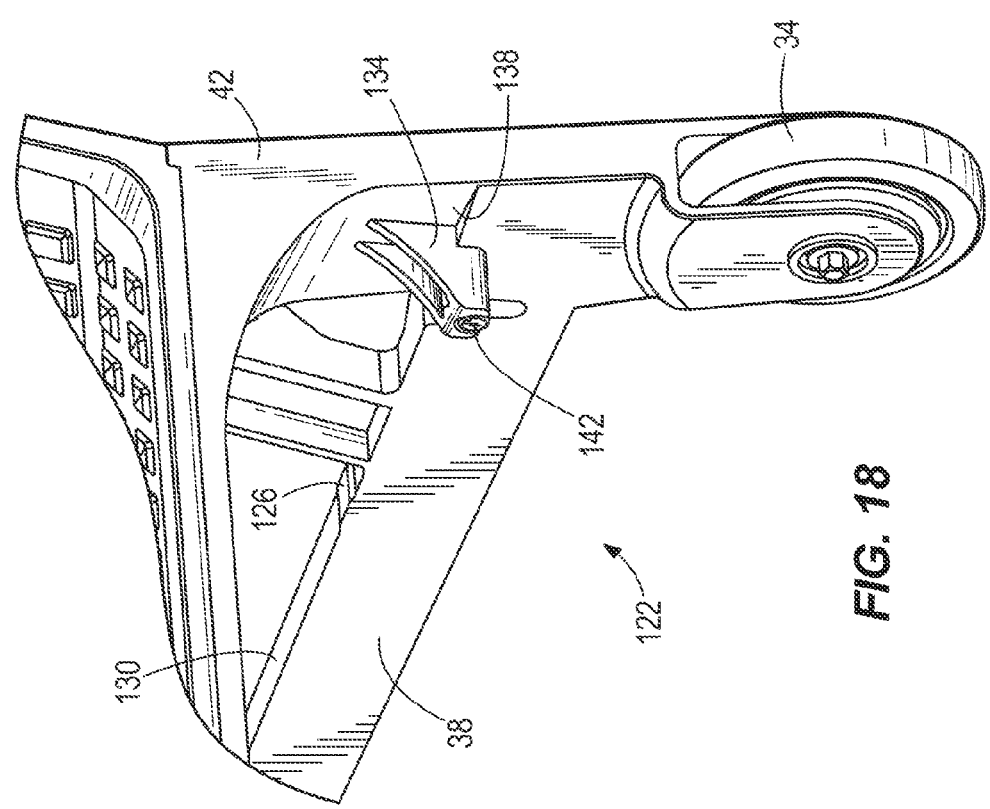
FIG. 18 is a perspective view of a caster lifting mechanism.
Figure 20:
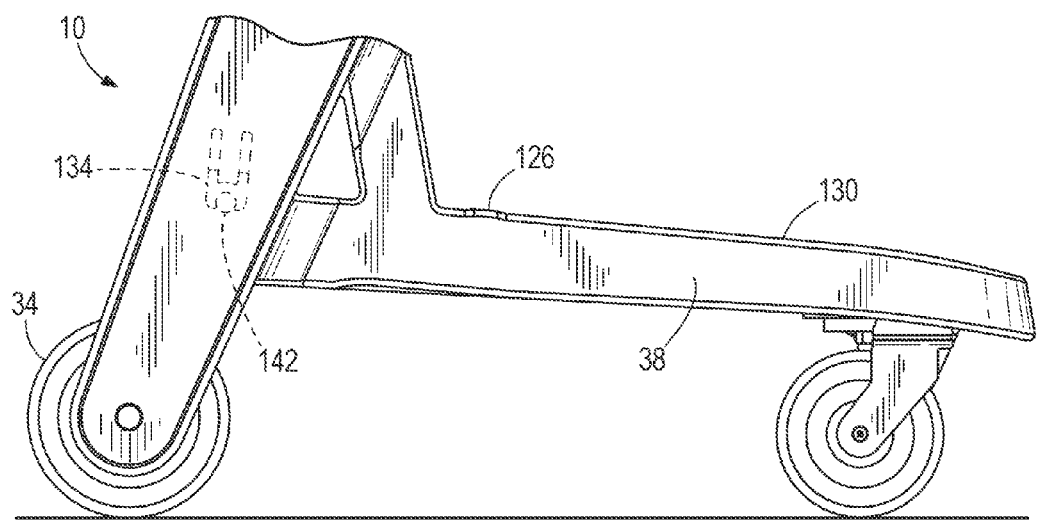
FIG. 20 is a partial side view of a shopping cart.

As shown in FIGS. 15-17, the frame 14 is formed in a mold 106. The mold includes a removable first module or insert 110. In the illustrated embodiment, the first insert 110 forms a portion of the frame base 38. The first insert 110 may be removed from the mold 106 and replaced with a second insert 114 that forms the same portion of the base 38, but the portion of the base 38 has a shorter dimension than the portion that is formed by the first insert 110. In other embodiments, the second insert 114 could provide a different shape for the portion of the base 38. In still other embodiments, the inserts 110, 114 could form a different portion of the frame 14 or another component of the cart 10. The removable inserts 110, 114 enable the operator to readily customize the size and shape of the manufactured frame 14 by changing the configuration of the mold 106. Because the mold 106 is capable of producing various frame configurations, the forming process requires only a single large mold 106 with several smaller inserts like the first insert 110 and second insert 114, rather than multiple large molds for each desired configuration. In this way, tooling costs are reduced.

Figure 21:
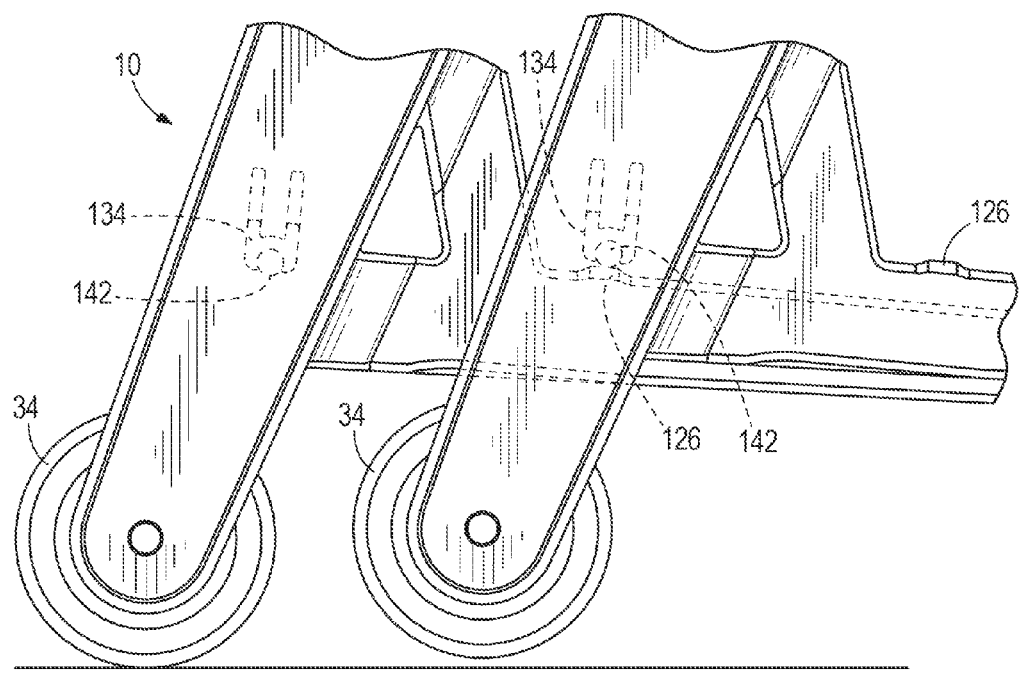
FIG. 21 is a partial side view of a pair of shopping carts nested together.

As shown in FIGS. 18-21, the frame 14 also includes a caster lift mechanism 122 to raise the wheels 34 when the cart 10 is nested or stacked with another cart. The caster lift mechanism 122 includes a ridge 126 formed on an upper surface 130 of the base 38, a housing 134 formed on an inside surface 138 of at least one of the arms 42, and an insert 142 (FIG. 19) positioned within the housing 134 and behind the cover 46. In one embodiment, the insert 142 is made of a wear-resistant plastic material. In the illustrated embodiment the housing 134 extends inwardly or toward the center of the base 38 and forms a cylindrical recess 146. The recess 146 is open at the inner end of the housing 134 and the housing 134 has a longitudinal slot 150 communicating with the bottom of the recess 146. The insert 142 is cylindrical and is inserted into the inner end of the recess 146 such that the lower portion of the insert 142 extends through the slot 150. Referring to FIG. 21, when a second cart is nested into the rear of a first cart 10, the insert 142 from the first cart 10 engages the ridge 126 and causes the rear of the first cart 10 to lift away from the ground. Lifting the rear end of the cart 10 insures that the rear wheels 34 do not contact the ground, thereby reducing the friction between the nested carts 10 and the ground. This reduced contact makes it easier for the nested carts 10 to be pushed and maneuvered together. Over time, the repeated engagement between the ridge 126 and the insert 142 will cause the insert 142 to wear down. The insert 142 provides a replaceable wear surface such that once the insert 142 wears down to a predetermined point, the user can replace the insert 142 to extend the working life of the caster lift mechanism 122.

Figure 22:
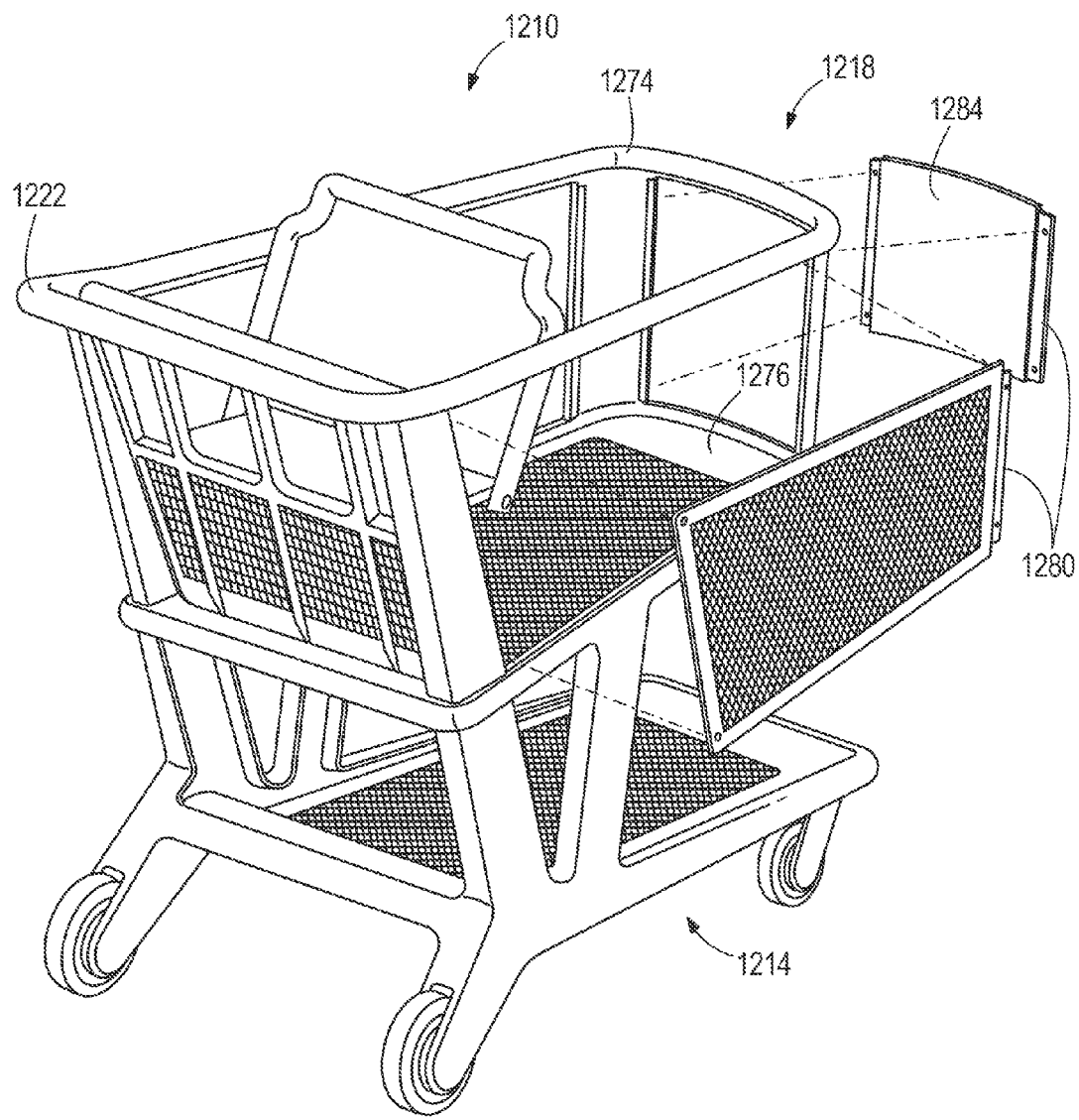
FIG. 22 is an exploded view of a shopping cart according to another embodiment.

In an alternative embodiment, shown in FIG. 22, the cart 1210 includes a basket frame 1274, a bottom surface 1276, and multiple walls 1280. The basket frame 1274 is configured to support multiple types of basket walls 1280 that can be removably coupled to the basket frame 1274. In one embodiment, the basket frame 1274 is molded separately from the walls 1280, and the walls 1280 are coupled to the basket frame 1274 by a snap fit. In other embodiments the walls 1280 are coupled by fasteners. The basket frame 1274 is configured to support many types of basket walls 1280, so the manufacturer can select a basket wall 1280 from many basket wall types in order to customize the cart as necessary. For instance, various walls 1280 may define different mesh patterns or wall cross-sections. This reduces the need to manufacture many types of baskets individually. Instead, the manufacturer can create the same basic frame 1274 and then select a particular wall 1280, thereby implementing a modular approach to manufacturing the basket frames 1274 from similar parts.

Figure 23A:
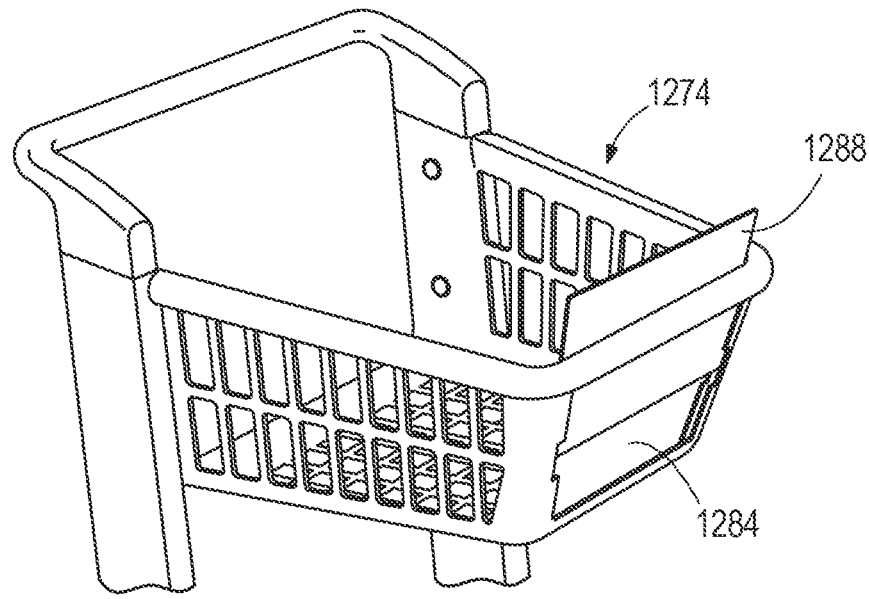
FIG. 23A is a perspective view of a shopping cart basket including a billboard panel.
Figure 23B:
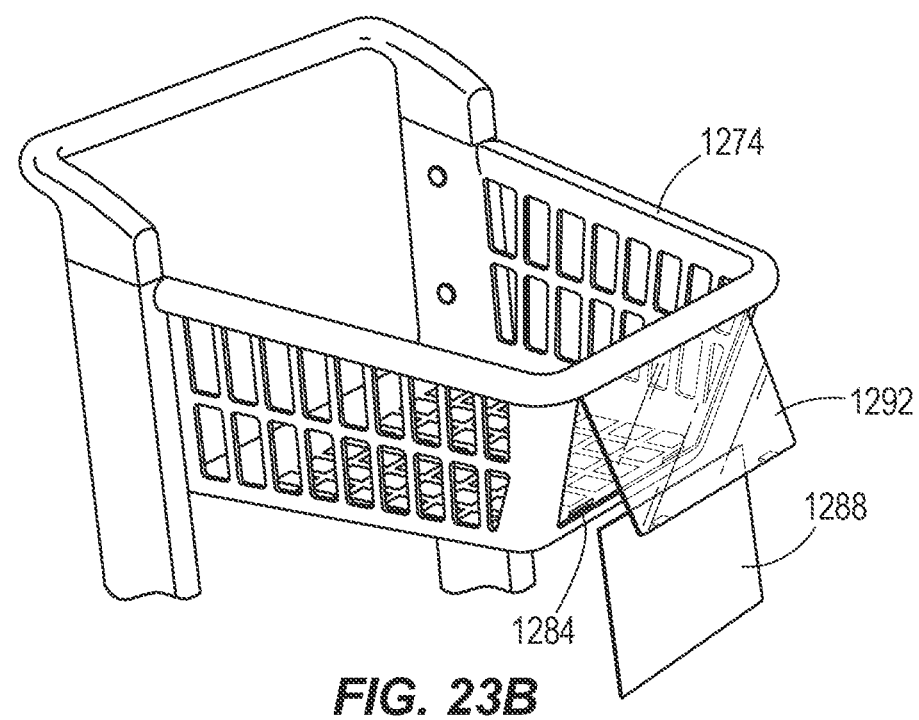
FIG. 23B is a perspective view of a shopping cart basket including a billboard panel according to another embodiment.
Figure 23C:
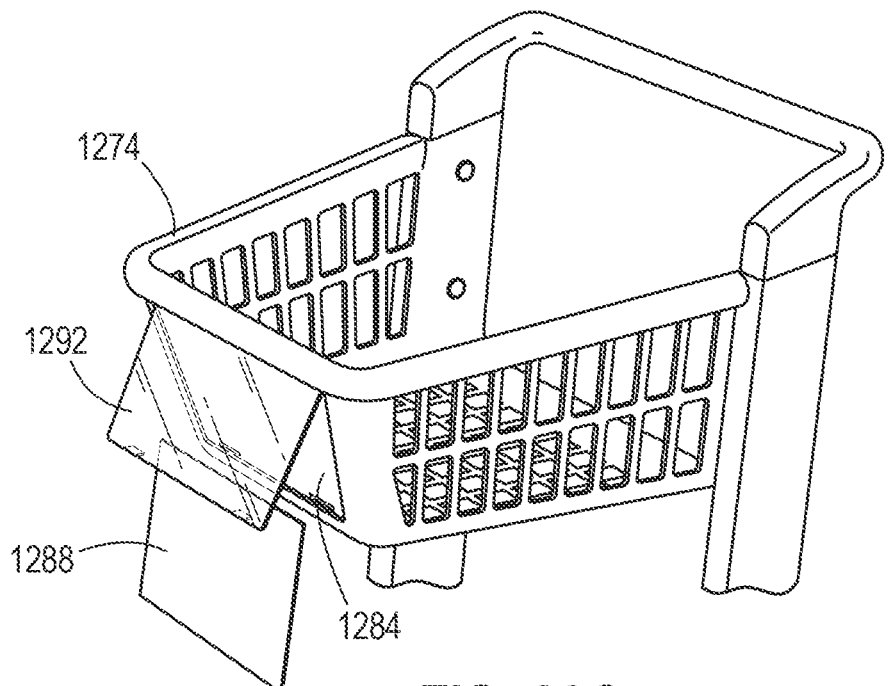
FIG. 23C is a perspective view of a shopping cart basket including a billboard panel according to another embodiment.
Figure 23D:
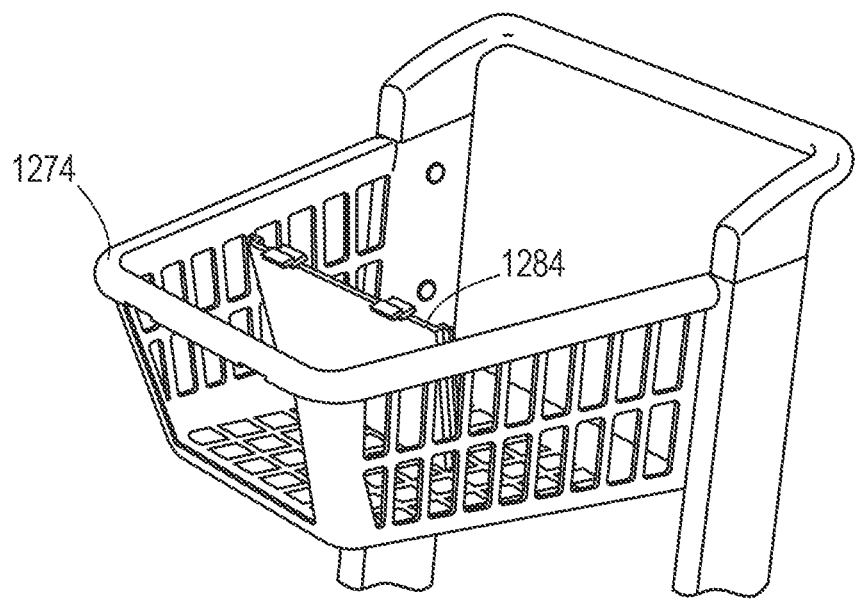
FIG. 23D is a perspective view of a shopping cart basket including a billboard panel according to another embodiment.

The wall 1280 of the basket frame 1274 may also include one or more billboard panels 1284 for displaying graphics or other information. The panels 1284 can be molded with an in-mold graphic foil 1288 (FIG. 23) and changed as desired (for example, seasonally). FIGS. 23A-23D provide various examples of billboard panels 1284. As shown in FIG. 23A, the graphic foil 1288 may be slidably received through the basket frame 1274 and positioned within the billboard panel 1284. Alternatively, FIGS. 23B and 23C show that the panel 1284 may include a transparent window 1292 that is pivotable relative to the basket frame 1274 to allow the graphic foil 1288 to be positioned behind the window 1292. The panel 1284 may also be removably fitted within the basket frame 1274, as shown in FIG. 23D.

Figure 24:
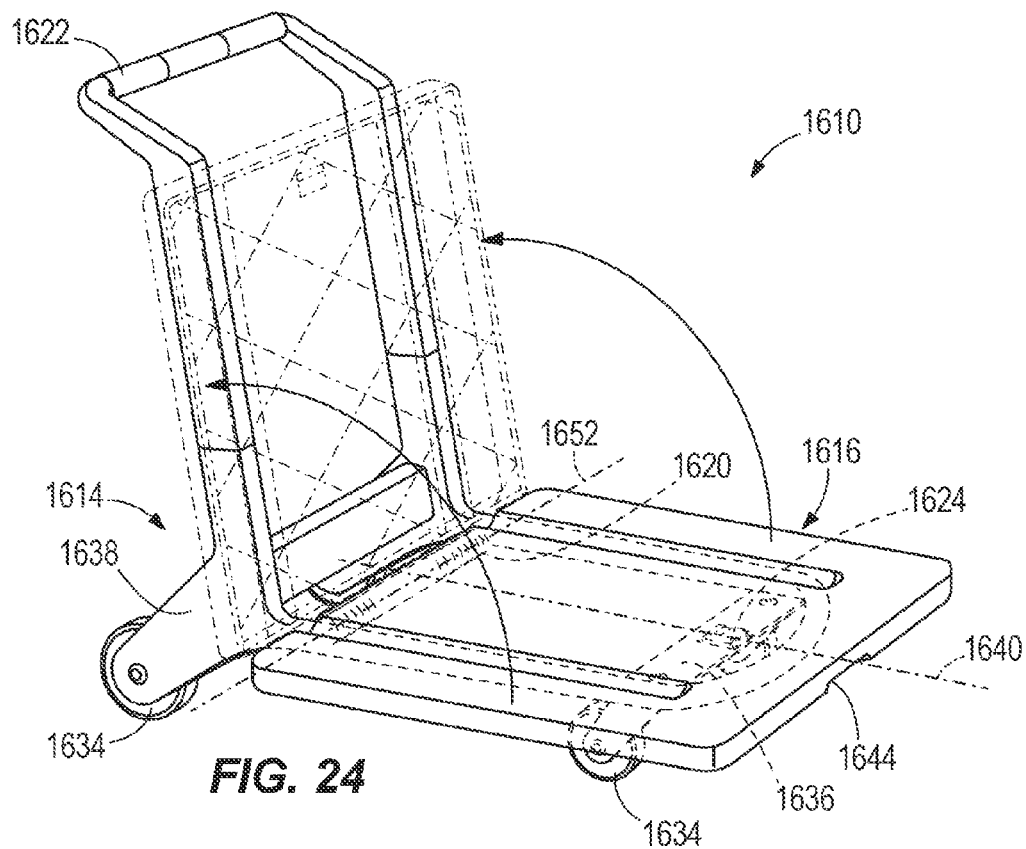
FIG. 24 is a perspective view of a flat-bed cart.

FIG. 24 shows a nesting flat-bed cart 1610. The flat-bed cart 1610 includes a frame 1614, a pivoting load bed or deck 1616, at least one spring-loaded slow-close hinge 1620, and a latch mechanism 1624. In one embodiment, the deck 1616 is made from a non-slip plastic material. The frame 1614 includes a base 1628 having a handle 1622, multiple wheels or casters 1634 coupled to the base for supporting movement of the frame over the ground, and a cross piece 1636. In the illustrated embodiment, the rear wheels 1634 can swivel, while the front wheels 1634 are fixed. The frame 1614 defines a longitudinal axis 1640. The deck 1616 includes a hand grip 1644 and a ribbed underside 1648 (FIG. 27) to provide increased rigidity.

The deck 1616 is pivotably attached to the base 1638 by the spring-loaded slow-close hinge 1620. The deck is pivotable about a pivot axis 1652 transverse to the longitudinal axis 1640. The slow-close hinge 1620 is similar to those used for toilet seats. The spring action of the hinge 1620 biases the deck 1616 toward an upright position as shown in FIG. 24. The latch mechanism 1624 is located on the cross piece 1636 extending between the front wheels 1634. When the deck 1616 is moved to a lowered or use position, the latch mechanism 1624 locks the deck 1616. In one embodiment, the latch mechanism 1624 includes a rotating hook (not shown). The hook may be spring-biased to automatically engage and lock the deck 1616 in place when the deck 1616 is moved to the lowered position. When the latch mechanism 1624 is unlocked, the slow-close hinge 1620 moves the deck 1616 to the upright position. The hand grip 1644 enables the user to assist in lifting the deck 1616 to the upright position. In other embodiments, a heavy spring or gas strut may be used in addition to or in place of the slow-close hinge 1620.

Figure 25:
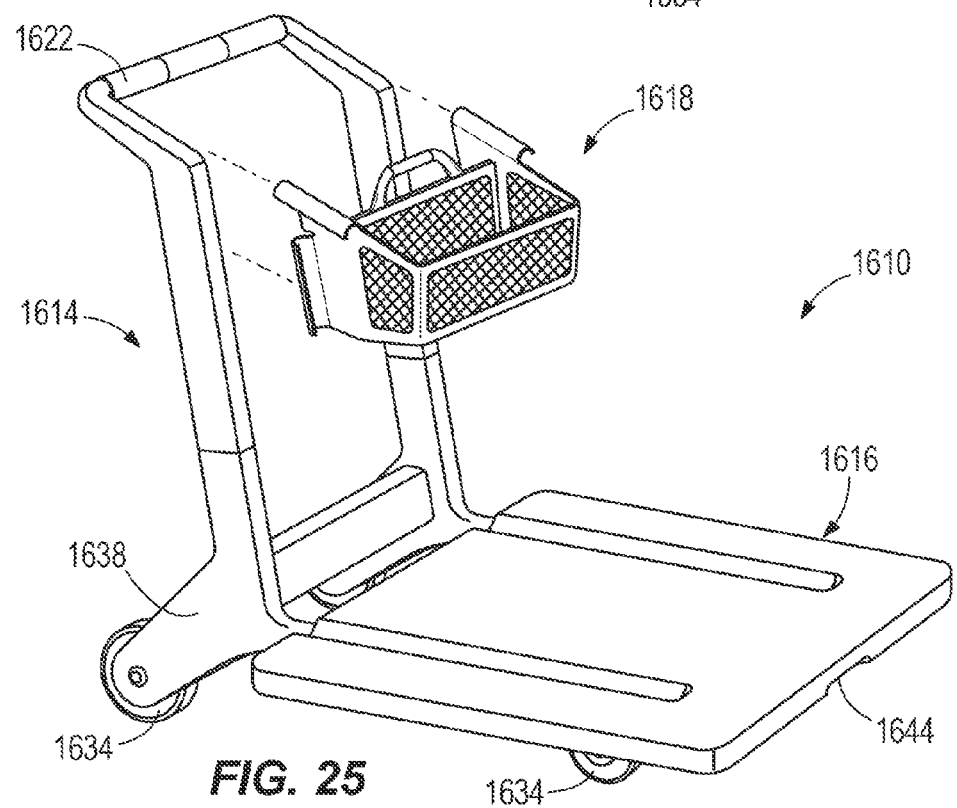
FIG. 25 is a perspective view of a flat-bed cart according to another embodiment.

With the decks 1616 in the upright position, multiple flat-bed carts 1610 can be stacked or nested together in a manner similar to the cart 10 of FIG. 1. That is, the frame of a second flat-bed cart 1610 can be pushed into the first flat-bed cart 1610 from the rear, such that the frames 1614 of the two carts 1610 nest together The flat-bed cart 1610 of FIG. 24 can be made with a frame 1614 that is similar to the frame 14 of FIG. 1 except with a different handle. In addition, the flat-bed cart 1610 of FIG. 24 can include the caster lift mechanism 122 described above with respect to FIGS. 18-21. In the embodiment shown in FIG. 25, the flat-bed cart 1610 further includes a small basket 1618 that can be removably attached to the handle 1622, such as by a snap fit or by fasteners. The basket 1618 may also be integrally formed with the handle 1622 or frame 1614.

Figure 26:
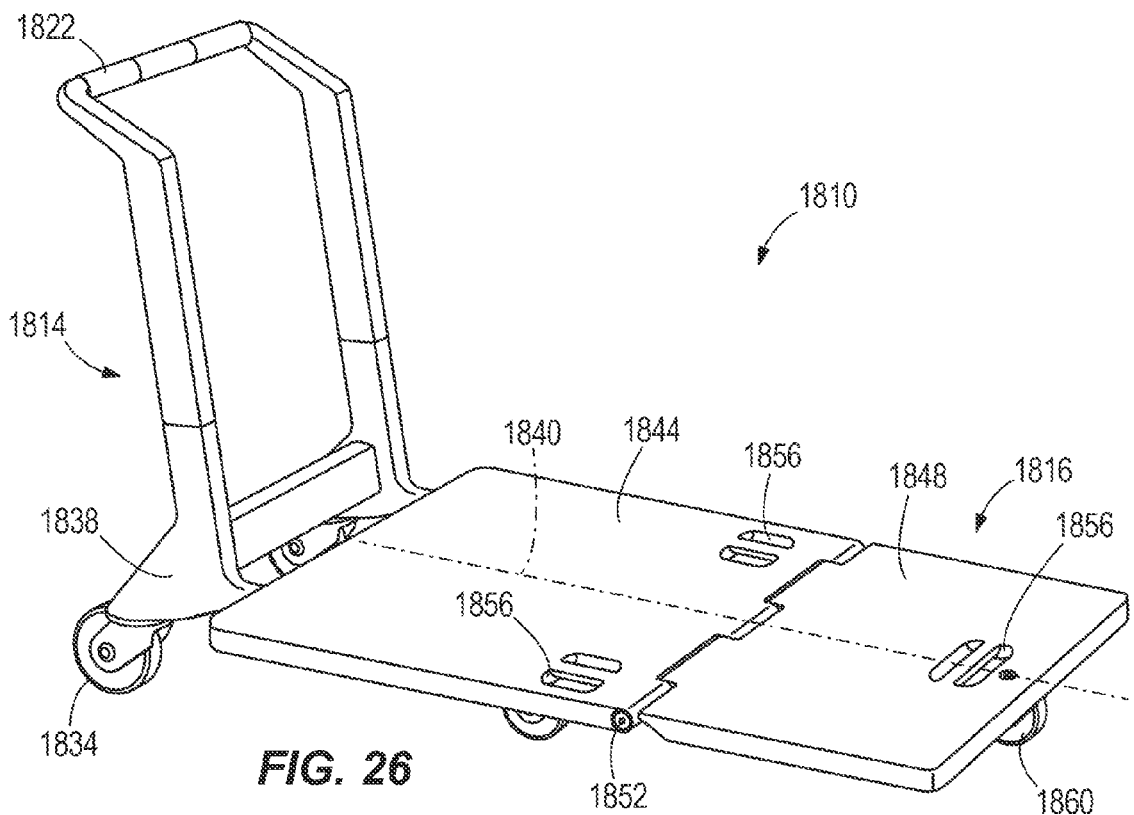
FIG. 26 is a perspective view of a flat-bed cart according to another embodiment in a lowered state.
Figure 27:
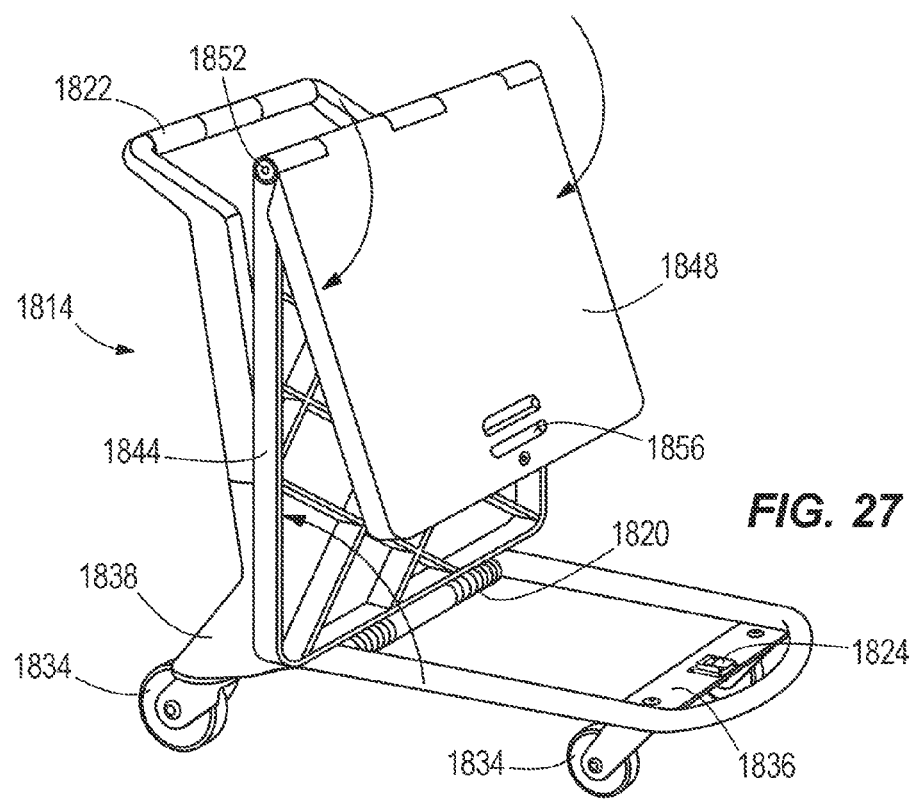
FIG. 27 is a perspective view of the flat-bed cart of FIG. 26 in an upright state.

FIGS. 26-27 disclose a nesting flat-bed cart 1810 with a folding deck 1816. The flat-bed cart 1810 of FIGS. 26-27 is similar to the flat-bed cart 1610 of FIG. 24, except that it is designed to support greater weights or loads. The deck 1816 includes a first or rear section 1844 pivotably coupled to the frame 1814, and a second or front section 1848 pivotably connected to the rear section 1844 by a hinge 1852. The deck 1816 folds along a lateral break line that is transverse to the longitudinal axis 1840 of the frame 1814, in a manner similar to a folding banquet table. The deck 1816 can pivot about the hinge 1852 when in a lowered position, which allows the flat-bed cart 1810 to accommodate bumps or rough surfaces over which the cart 1810 travels. In the illustrated embodiment, the front section 1848 and rear section 1844 include at least one hand grip 1856 for moving the deck 1816 between the upright and lowered positions, and the front section 1848 includes one or more casters 1860. In one embodiment, a single caster 1856 is used for supporting up to 2000 pounds and two casters 1856 are used for supporting up to 3000 pounds.

Various features of the invention are set forth in the following claims.

What is claimed is:

1. A shopping cart having a front end and a rear end, the cart comprising:
   a frame supported for movement over the ground, the frame including an upright portion;
   a tray supported on the frame proximate the ground;
   a handle for pushing the cart, the handle coupled to the upright portion of the frame;
   a first basket coupled to the frame and positioned above the tray, the first basket secured against movement relative to the frame, the first basket being configured to be loaded from the rear, the first basket including a rear wall; and
   a second basket coupled to the frame and positioned above the first basket, the second basket secured against movement relative to the frame, the second basket including a rear wall positioned forward of the rear wall of the first basket;
   wherein the handle is removably coupled to the frame and configured to secure the first basket against movement relative to the frame.

2. The shopping cart of claim 1, wherein a cart axis extends between the front end and the rear end of the cart, and wherein the handle is pivotably coupled to the cart about a handle axis that is transverse to the cart axis.

3. The shopping cart of claim 1, wherein the handle is moveable to permit the first basket to be loaded from the rear.

4. The shopping cart of claim 1, wherein the first basket is loaded from the rear and from a direction beneath the handle.

5. The shopping cart of claim 1, wherein the first basket defines a first length in a direction parallel to the cart axis, and the second basket defines a second length in a direction parallel to the cart axis, the second length being shorter than the first length.

6. The shopping cart of claim 5, wherein the first basket is configured to nest with a first basket of a second shopping cart, and the second basket is configured to nest with a second basket of the second shopping cart.

7. The shopping cart of claim 6, further comprising a first gate pivotably coupled to the first basket about a first gate axis and a second gate pivotably coupled to the second basket about a second gate axis, the first gate and the second gate positioned proximate the rear end of the cart, wherein a cart axis extends between the front end and the rear end of the cart and the first gate axis and the second gate axis are each transverse to the cart axis.

8. The shopping cart of claim 7 wherein the first gate is pivotable upward to receive a first basket of the second shopping cart from the rear, and the second gate is pivotable upward to receive a second basket of the second shopping cart from the rear.

9. The shopping cart of claim 1, wherein the first basket is positioned closer to a rear end of the cart than the second basket.

10. The shopping cart of claim 9, wherein the first basket is configured to nest with a first basket of a second shopping cart, and the second basket is configured to nest with a second basket of the second shopping cart.

11. The shopping cart of claim 10, further comprising a first gate pivotably coupled to the first basket about a first gate axis and a second gate pivotably coupled to the second basket about a second gate axis, wherein the first gate axis and the second gate axis are each transverse to an axis of the cart.

12. The shopping cart of claim 11, wherein the first gate is upwardly pivotable to receive a first basket of the second shopping cart, and the second gate is upwardly pivotable to receive a second basket of the second shopping cart.

13. A shopping cart having a front end and a rear end and defining a cart axis therebetween, the cart comprising:
   a frame supported for movement over the ground;
   a tray supported on the frame proximate the ground;
   a handle for pushing the cart;
   a first basket coupled to the frame and positioned above the tray, the first basket secured against movement relative to the frame, the first basket including a moveable first gate positioned proximate the rear end and forward of the handle; and
   a second basket coupled to the frame and positioned above the first basket, the second basket secured against movement relative to the frame, the second basket including a moveable second gate positioned forward of the first gate of the first basket.

14. The shopping cart of claim 13, wherein the first gate is pivotable about a first gate axis and the second gate is pivotable about a second gate axis, the first gate axis positioned closer to the rear end of cart than the second gate axis.

15. The shopping cart of claim 14, wherein the first gate axis and the second gate axis are each transverse to the cart axis.

16. The shopping cart of claim 13, wherein the first gate is upwardly swung such that the first basket receives a first basket of a second shopping cart, and the second gate is upwardly swung such that the second basket receives a second basket of the second shopping cart.

17. The shopping cart of claim 13, wherein the first basket is positioned closer to the rear end of the cart than the second basket, and wherein the first basket has a longer length than the second basket.

18. The shopping cart of claim 13, wherein the first basket has a rearward end, and wherein the second basket has a rearward end forward of the rearward end of the first basket.

19. The shopping cart of claim 18, wherein a cart axis extends between the front end and the rear end of the cart, wherein the handle is pivotably coupled to the cart about a handle axis that is transverse to the cart axis, the handle being pivotable between a rearward position allowing a user to push the cart, and a forward position in which the handle is forward of the rearward end of the first basket to facilitate rear loading of the first basket.

20. The shopping cart of claim 19, wherein the first gate has a wall extending across the rearward end of the first basket when the first gate is in a lower position, the wall having an upper end below an upper end of the first basket when the first gate is in a lower position, so as to facilitate rear loading of the first basket.

* * * * *